United States Patent
Braithwaite et al.

(10) Patent No.: US 9,256,794 B2
(45) Date of Patent: Feb. 9, 2016

(54) SYSTEMS AND METHODS FOR FACE AUTHENTICATION OR RECOGNITION USING SPECTRALLY AND/OR TEMPORALLY FILTERED FLASH ILLUMINATION

(75) Inventors: Michael Braithwaite, Langhorne, PA (US); Mohamed Nabil Moustafa, New Cairo (EG); Andrew Philip Govan Date, Singapore (SG); Jason Chaikin, Springfield, NJ (US)

(73) Assignee: XID Technologies PTE LTD, Singapore (SG)

( * ) Notice: Subject to any disclaimer, the term of this patent is extended or adjusted under 35 U.S.C. 154(b) by 0 days.

(21) Appl. No.: 13/997,185

(22) PCT Filed: Dec. 21, 2011
(Under 37 CFR 1.47)

(86) PCT No.: PCT/SG2011/000446
§ 371 (c)(1),
(2), (4) Date: Jan. 30, 2014

(87) PCT Pub. No.: WO2012/087245
PCT Pub. Date: Jun. 28, 2012

(65) Prior Publication Data
US 2015/0262024 A1   Sep. 17, 2015

Related U.S. Application Data

(60) Provisional application No. 61/425,766, filed on Dec. 22, 2010.

(51) Int. Cl.
*G06K 9/00*   (2006.01)
*G06K 9/20*   (2006.01)

(52) U.S. Cl.
CPC .......... *G06K 9/2036* (2013.01); *G06K 9/00255* (2013.01); *G06K 9/00906* (2013.01); *G06K 9/2018* (2013.01); *G06K 9/2027* (2013.01)

(58) Field of Classification Search
CPC ............... B60R 21/01534; B60R 21/01538; G06K 9/00221; G06K 9/2018
USPC ......................................... 382/118
See application file for complete search history.

(56) References Cited

U.S. PATENT DOCUMENTS

| | | | |
|---|---|---|---|
| 6,556,279 B1 | 4/2003 | Meisburger et al. | |
| 2007/0189583 A1* | 8/2007 | Shimada et al. | 382/118 |
| 2008/0212849 A1 | 9/2008 | Gao | |
| 2012/0163783 A1* | 6/2012 | Braithwaite et al. | 396/18 |

FOREIGN PATENT DOCUMENTS

| | | |
|---|---|---|
| EP | 1818855 A2 | 8/2007 |
| KR | 100795160 B1 | 1/2008 |

OTHER PUBLICATIONS

International Search Report (mailing date Jul. 24, 2012) for International PCT Patent Application No. PCT/SG2011/000446, filed Dec. 21, 2011.

* cited by examiner

*Primary Examiner* — Manuchehr Rahmjoo
(74) *Attorney, Agent, or Firm* — Howard & Howard Attorneys PLLC

(57) ABSTRACT

A face authentication or recognition system embodiment includes a processing unit; a flash illumination drive circuit; a flash illumination unit having a flashlamp configured to generate a set of flash illumination pulses; a set of spectral filters configured to pass a set of spectrally filtered flash illumination pulses; a lens; an image sensor configured to receive a set of filtered flash illumination pulses reflected from a subject's face and generate a corresponding facial image dataset; and a memory or data storage device configured to store facial image datasets, enrollment datasets, and query datasets, and which includes a face authentication or recognition module. Spectrally filtered flash illumination pulses have an intensity at least approximately equal to the intensity of ambient sunlight, essentially regardless of an outdoor environment under consideration upon or proximate to the surface of the earth. Spectrally filtered flash illumination reflected from the subject's face can be readily distinguished from ambient light, regardless of the environment in which the subject's facial image was captured, providing surprisingly robust facial authentication and/or recognition performance essentially regardless of ambient lighting conditions.

15 Claims, 14 Drawing Sheets

SYSTEMS AND METHODS FOR FACE AUTHENTICATION OR RECOGNITION USING SPECTRALLY AND/OR TEMPORALLY FILTERED FLASH ILLUMINATION

TECHNICAL FIELD

The present disclosure relates to various types of user authentication, recognition, or access control systems, apparatuses, devices, and techniques that facilitate or enable successful face authentication or recognition in a manner that is independent or essentially independent of ambient or environmental lighting conditions. More particularly, the present disclosure relates to systems, apparatuses, devices, or techniques that selectively control aspects of flashtube, flashlamp, or flash bulb operation in association with appropriate spectral filtering and/or temporal filtering to capture facial images. Particular aspects of the present disclosure additionally relate to enhanced efficiency facial image data processing algorithms.

BACKGROUND

Biometrics refers to automated techniques for establishing the identity of a human subject by uniquely detecting, determining, or recognizing subject-specific characteristics that fall within an essentially universal or population-based category of intrinsic human characteristics, features, or traits. Various types of biometric systems exist, including systems directed to uniquely identifying a subject based upon fingerprint, palm print, retinal pattern, or facial feature data.

Technological advancements have significantly improved the feasibility of automated face recognition systems. In general, face recognition systems capture one or more facial images of a subject under consideration; extract subject-specific facial features from the captured images; and determine a best match between the extracted facial features and reference facial feature data corresponding to a number of subjects, including the subject under consideration.

The appearance of the same subject's face can dramatically change under different lighting conditions, particularly with respect to the angles at which one or more light sources are disposed and/or the illumination intensities of such light sources relative to the subject's face. For instance, a given subject's face can appear dramatically different between low, generally low, or mixed light conditions (e.g., a dimly lit room, or an outdoor scene under a shaded tree) and bright light conditions (e.g., a snowy winter scene, in which the subject may appear silhouetted).

Face recognition systems have historically suffered from the inability to provide accurate, consistent, or reliable recognition results under varying lighting conditions. While certain face recognition techniques have demonstrated high recognition accuracy under highly controlled or predictable lighting conditions (e.g., typical indoor environments such as home or office settings), recognition accuracy substantially decreases when such techniques are applied across a range of uncontrolled or less-predictable real-world lighting situations (e.g., outdoor environments). More particularly, different or unpredictable real world lighting conditions can result in poor or unreliable face recognition system performance as a result of increased rates of false rejection or false acceptance.

As described in "Illumination Invariant Face Recognition Using Near-Infrared Images" by Li et al., *IEEE Transactions on Pattern Analysis and Machine Intelligence*, Vol. 29, No. 4, April 2007, one approach for improving face recognition accuracy across variable lighting conditions relies upon the generation and application of relatively low intensity near-infrared (NIR) illumination of a known intensity to a subject's face, the capture of NIR facial image data, and the processing of the NIR facial image data in accordance with a facial recognition algorithm. However, Li et al. admit that this approach is not suitable for use in outdoor environments, because ambient outdoor light includes a strong near-infrared component.

In "Specific Sensors for Face Recognition," *Advances in Biometrics, Lecture Notes in Computer Science*, 2005, Volume 3832/2005, 47-54 (Springer-Verlag), Hizem et al. describe a NIR-based face recognition technique in which an array of infrared LEDs is used to capture facial images. Unfortunately, the technique described by Hizem et al. results in a bulky and/or cost inefficient device that fails to provide suitable facial recognition performance across a sufficiently wide range of real-world lighting conditions. Additionally, the technique described by Hizem et al. may not be able to reliably determine whether a captured facial image corresponds to a live person rather than, for example, a printed picture of a person.

It is therefore desirable to provide a solution to address at least one of the foregoing problems associated with existing approaches for face recognition or authentication.

SUMMARY

In accordance with an aspect of the disclosure, a system for face authentication or recognition includes a flash illumination unit having a flashtube, the flash illumination unit configured to output a flash illumination pulse having a spectral content and a pulse duration; a set of spectral filters configured to receive a flash illumination pulse generated by the flash illumination unit and configured to pass a spectrally filtered flash illumination pulse that includes optical wavelengths within at least one of a near-infrared (NIR) and an infrared (IR) portion of the optical spectrum; an image sensor configured to receive reflected illumination from a subject having a face, the reflected illumination corresponding to the spectrally filtered flash illumination pulse, the image sensor further configured to capture an image during an image capture interval and generate a corresponding facial image dataset; a memory configured to store the facial image dataset; and a processing unit configured to perform one of face authentication operations and face recognition operations upon the stored facial image dataset to respectively one of authenticate and recognize an identity of the subject.

The flash illumination pulse duration can be less than approximately 500 microseconds, for instance, approximately 10-250 microseconds, and the image capture interval can be approximately equal to or less than this pulse duration. within a spatial region that is proximate to the flash illumination unit (e.g., which exists at a distance of less than approximately 1 meter from the flash illumination unit) the spectrally filtered flash illumination pulse has an intensity that is at least approximately equal to an intensity of ambient sunlight within an outdoor scene that is brightly lit as a result of the ambient sunlight. A vertical offset or separation distance between the image sensor and at least one of the flash illumination unit and the set of spectral filters can be less than approximately 25 cm.

The set of spectral filters is configured to block spectral content corresponding to optical wavelengths shorter than NIR wavelengths. The system can include a flash illumination control circuit configured to drive the flash illumination unit in a manner that preferentially shifts the spectral content of the flash illumination pulse toward the IR portion of the optical spectrum, for instance by driving the flash illumination unit at a reduced power level that is between approximately 5%-50% of a maximum power level corresponding to the flash illumination unit.

An image capture plane of the image sensor can be tilted relative to a planar surface from which the spectrally filtered flash illumination pulse exits the set of spectral illumination filters by approximately 5-15 degrees.

The flash illumination unit, the set of spectral filters, and the image sensor can form portions of one of an entryway access control system, a computer access control system, a user identity consistency verification system, a financial transaction authorization system, a portable communication device usage authorization system, an automotive vehicle operation authorization system, a mechanized equipment operation authorization system, a firearm usage authorization system, a portable facial image capture system, and a wearable facial image capture system.

The flash illumination unit, the set of spectral filters, and the image sensor can be coupled to one of a computer display device, an automated teller machine (ATM), a point of sale authorization device, a mobile phone, an automotive vehicle, a piece of mechanized equipment, and a firearm usage authorization system.

In accordance with an aspect of the present disclosure, a system for face authentication or recognition can include a flash illumination unit having a flashtube configured to generate a flash illumination pulse by way of a glow discharge process, the flash illumination pulse having a pulse duration of less than approximately 500 microseconds and spectral content that includes NIR optical wavelengths and visible optical wavelengths; a set of spectral filters configured to receive a flash illumination pulse generated by the flash illumination unit and configured to pass a spectrally filtered flash illumination pulse that at least substantially excludes optical wavelengths shorter than NIR optical wavelengths, the spectrally filtered flash illumination pulse having within a target illumination region less than approximately 1 meter from the set of spectral filters an intensity that is at least approximately equal to the intensity of ambient sunlight within an outdoor scene that is brightly lit as a result of the ambient sunlight; an image sensor configured to receive reflected illumination corresponding to the spectrally filtered flash illumination pulse from a subject disposed within the target illumination region and configured to generate an image dataset corresponding to the subject; and at least one of communication resources and memory resources that enable the transfer of the image dataset to a processing unit configured for performing one of face authentication operations and face recognition operations upon the image dataset.

In accordance with another aspect of the disclosure, a face authentication or recognition process includes generating a flash illumination pulse by way of an electric glow discharge process, the flash illumination pulse having a spectral content and a pulse duration; generating a spectrally filtered flash illumination pulse that includes optical wavelengths within at least one of a NIR and an IR portion of the optical spectrum; capturing reflected illumination from a subject having a face, the reflected illumination corresponding to the spectrally filtered flash illumination pulse; generating a facial image dataset corresponding to the reflected illumination; storing the facial image dataset in a memory; and performing one of face authentication and face recognition operations using the set of facial image data to respectively one of authenticate and recognize an identity of the subject.

Generating the spectrally filtered flash illumination pulse comprises blocking spectral content having a wavelength that is shorter than NIR wavelengths. The process can include driving the flash illumination unit in a manner that preferentially shifts the spectral content of the flash illumination pulse toward the IR portion of the optical spectrum, such as driving the flash illumination unit at a reduced power level that is between approximately 5%-50% of a maximum power level corresponding to the flash illumination unit.

The process can further include controlling one of subject access to an entryway, subject operation of a computer, subject financial transaction authorization, subject operation of a portable communication device, subject operation of an automotive vehicle, subject operation of a piece of mechanized equipment, and subject operation of a firearm based upon one of the face authentication and face recognition operations.

In accordance with an aspect of the disclosure, processing a facial image dataset includes processing the facial image dataset to identify a face rectangle; processing the face rectangle to identify a set of candidate positions corresponding to a pair of eyes on the subject's face; processing the face rectangle to determine a best candidate position for the pair of eyes; and generating a plurality of enrolment datasets corresponding to the facial image dataset based upon an accuracy of an eye finder.

In accordance with another aspect of the disclosure, processing a facial image dataset includes processing the facial image dataset to identify a face rectangle; processing the face rectangle to identify a set of candidate positions corresponding to a pair of eyes on the subject's face; processing the face rectangle to determine a best candidate position for the pair of eyes; generating a query dataset corresponding to the face rectangle and the best candidate position for the pair of eyes; and processing the query dataset using a plurality of matching techniques relative to at least one enrollment dataset.

Processing the facial image dataset to identify a face rectangle can include processing the facial image dataset using a Haar cascade face finder. Processing the face rectangle to identify a set of candidate positions corresponding to a pair of eyes can include processing the face rectangle using a Haar cascade filter. Processing the face rectangle to identify the best candidate position for the pair of eyes can include processing the face rectangle using a Gabor eye finder.

In accordance with an aspect of the disclosure, processing a query dataset using a plurality of matching techniques includes processing the query dataset using a first matching technique relative to the at least one enrollment dataset; generating a first distance measure corresponding to the first matching technique; determining whether the first distance measure indicates an accept or reject condition; and generating one of an amended query dataset an amended enrolment dataset in the event that the first distance measure fails to indicate an accept or reject condition.

Processing the query dataset using a plurality of matching techniques can include processing the query dataset using a first matching technique relative to the at least one enrollment dataset; generating a first distance measure; processing the query dataset using at least one of a second matching technique and a third matching technique relative to the at least one enrollment dataset; generating at least one of a second distance measure corresponding to the second matching technique and a third distance measure corresponding to the third matching technique; generating a consensus distance measure using at least two of the first distance measure, the second distance measure, and the third distance measure; and determining whether the consensus distance measure indicates one of an accept condition and a reject condition. The first matching technique can exhibit a higher computational efficiency than at least one of the second matching technique and the third matching technique.

In accordance with a further aspect of the disclosure, performing one of face authentication and face recognition operations can include determining a likelihood that the subject is a live person.

In accordance with another aspect of the disclosure, a process for face authentication or recognition includes generating a flash illumination pulse by way of an electric glow discharge process, the flash illumination pulse having a pulse duration of less than approximately 500 microseconds and a spectral content that includes near-infrared (NIR) optical wavelengths and visible optical wavelengths; generating a spectrally filtered flash illumination pulse that includes optical wavelengths within at least one of a NIR and an IR portion of the optical spectrum and which at least substantially excludes optical wavelengths shorter than NIR optical wavelengths, the spectrally filtered flash illumination pulse having within a target illumination region less than approximately 1 meter from the set of spectral filters an intensity that is at least approximately equal to the intensity of ambient sunlight within an outdoor scene that is brightly lit as a result of the ambient sunlight; capturing reflected illumination from a subject having a face, the reflected illumination corresponding to the spectrally filtered flash illumination pulse; generating a facial image dataset corresponding to the reflected illumination; transferring the facial image dataset to at least one of memory resources configured for storing the facial image dataset and processing resources configured for performing one of face authentication operations and face recognition operations upon the facial image dataset.

BRIEF DESCRIPTION OF THE DRAWINGS

Embodiments of the disclosure are described hereinafter with reference to the following drawings, in which.

DETAILED DESCRIPTION

Figure 1A:
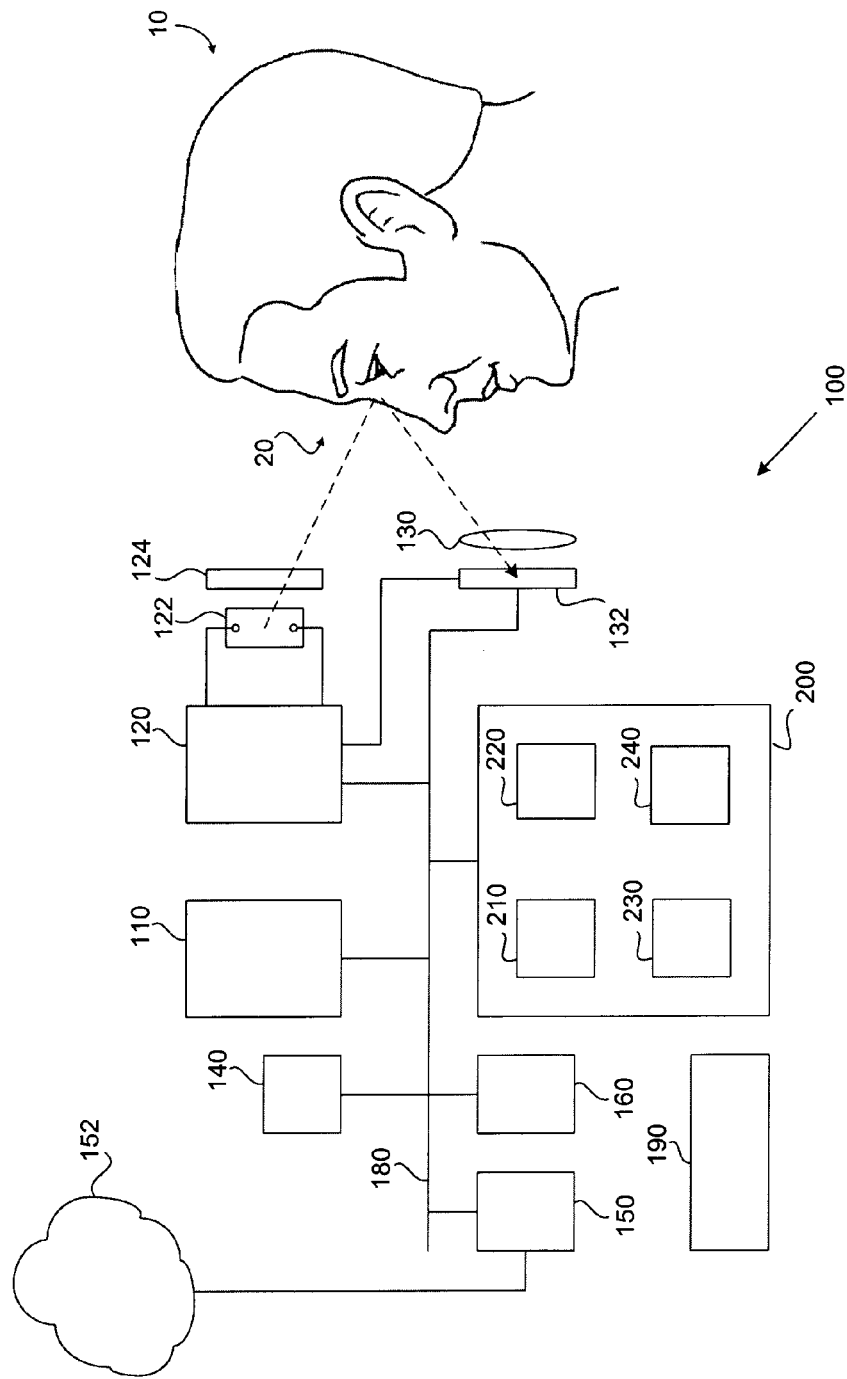
FIG. 1A is a block diagram of a flash-based face authentication and/or recognition system according to an embodiment of the disclosure.

Various embodiments of the present disclosure are directed to subject or user detection, authentication, recognition, discrimination, and/or access control systems, apparatuses, devices, and techniques that can selectively control or operate one or more high or very high intensity illumination sources (e.g., a flashtube, flashlamp, or flash bulb configured to generate pulses of flash illumination by way of an electric glow discharge process) in association with spectral and/or temporal filtering, and possibly optical integration and/or spatial limiting or filtering, in order to capture or generate facial image data in a manner that is independent, essentially independent, or substantially independent of ambient lighting conditions.

In the present disclosure, depiction of a given element or consideration or use of a particular element number in a particular FIG. or a reference thereto in corresponding descriptive material can encompass the same, an equivalent, or an analogous element or element number identified in another FIG. or descriptive material associated therewith.

In the context of the present disclosure, the term set is generally defined as a non-empty finite organization of elements that mathematically exhibits a cardinality of at least 1 (i.e., a set as defined herein can correspond to a singlet or single element set, or a multiple element set), in accordance with known mathematical definitions (for instance, in a manner corresponding to that described in *An Introduction to Mathematical Reasoning: Numbers, Sets, and Functions*, "Chapter 11: Properties of Finite Sets" (e.g., as indicated on p. 140), by Peter J. Eccles, Cambridge University Press (1998)).

In accordance with various embodiments of the present disclosure, a dataset can be defined as a single or singular array of signal values or data values. An image dataset can be defined as a single or singular array of signal values or data values, such as an array of pixel values, which is generated in association with or as a result of the capture of illumination within a field of view or an image capture area provided by an image capture device or image sensor. A facial image dataset can be defined as a single or singular array of signal or data values, such as an array of pixel values, which is generated in association with or as a result of the capture of illumination reflected from the face of a subject or user. Thus, a facial image dataset includes facial image data (e.g., pixel values) that corresponds to or represents a facial image of a subject or user.

Portions of systems, apparatuses, and/or devices in accordance with multiple embodiments of the present disclosure are configured for capturing or generating facial image datasets. Depending upon embodiment details and/or a mode of system, apparatus, or device operation, a facial image dataset can correspond to, be used to generate, or be stored as (a) a reference or enrollment or enrolled dataset; or (b) a query dataset that can be processed or analysed in view of one or more reference or enrolled datasets to facilitate subject or user detection, authentication, recognition, discrimination, or access control operations.

A reference, enrollment, or enrolled dataset can be defined as a dataset corresponding to or correlated with a facial image of an a priori known, established, targeted, valid, or authorized (e.g., a pre-authorized) subject or user, which can be utilized or accessed in association with future or subsequent subject or user authentication, recognition, or discrimination operations. Some embodiments in accordance with the present disclosure generate a plurality of enrollment datasets corresponding to each known subject or user. Depending upon embodiment details, the characteristics and/or number of reference or enrollment datasets generated for a given known subject or user can be identical to or different from the characteristics and/or number of reference or enrollment datasets generated for another known subject user.

A query dataset can be defined as a dataset corresponding to or correlated with a facial image of a subject or user that is to be authenticated, recognized, or discriminated, which can be processed or analysed in association with one or more face authentication, recognition, or discrimination processes or algorithms.

In accordance with embodiments of the present disclosure, one or more of a manner in which illumination is generated; illumination is spectrally and/or temporally filtered, and possibly optically integrated and/or spatially limited or filtered; illumination is directed toward or to the face of a subject or user; facial image datasets are captured; reference or enrollment datasets are generated; query datasets are generated; and query datasets are processed in association with one or more face detection, authentication, recognition, or discrimination processes can facilitate or enable reliable, high or very high accuracy face detection, authentication, recognition, or discrimination regardless, essentially regardless, or substantially regardless of ambient lighting conditions.

For purposes of brevity and clarity, the description herein is directed to particular embodiments of facial image capture and/or subject or user recognition, authentication, discrimination, or access control systems, apparatuses, devices, and techniques. This, however, does not preclude the applicability of the disclosure to other embodiments and/or other applications in which fundamental principles prevalent among the various embodiments of the disclosure such as operational, functional, or performance characteristics are required. Representative embodiments of the disclosure for addressing one or more of the foregoing problems associated with conventional systems, apparatuses, devices, and techniques for face recognition or authentication are described hereafter with reference to FIGS. 1A to 6. In the description that follows, like or analogous reference numerals indicate like or analogous elements.

Aspects of Representative Flash-Based Face Authentication or Recognition Systems FIG. 1A is a schematic illustration of a flash-based face authentication and/or recognition system 100 according to an embodiment of the disclosure, which is configured to (a) capture facial image data corresponding to one or more portions of the face 20 of a subject or user 10, where such facial image data is generated using flash illumination output by at least one flash bulb, flashlamp, or flashtube; and (b) perform face detection, authentication, recognition, or discrimination operations based upon such captured facial image data.

In an embodiment, the system 100 includes a controller (e.g., a microcontroller), processor, or processing unit 110; a flash illumination drive circuit 120; a flash illumination unit 122 that includes at least one flash bulb, flashlamp, or flashtube; a set of spectral filters 124; a lens 130; at least one image sensor or image capture device 132; and a memory 200 that includes a captured image memory 210, a query image memory 220, an authentication or recognition processing memory 230, and a face detection, authentication, recognition, and/or discrimination module 240.

The system 100 can further include a control interface or user interface 140, which can include a set of input devices responsive to user input and/or a set of sensing elements responsive to environmental conditions. A user interface 140 can include one or more of switch, a button, a card reader (e.g., an RFID or magnetic card reader), a touchpad or keypad, a keyboard, a pointing device (e.g., a mouse), a motion sensor, a light sensor, a thermal sensor, a vibration sensor, a microphone, and/or another type of device. In some embodiments, the user interface 140 further includes an output device such as a display device (e.g., a computer monitor or display such as an LCD or LED based display) and/or a speaker. Depending upon embodiment details, portions of the control or user interface 140 can be directly accessible or visible to a subject or user 10 facing the system 100, or remote or hidden from the subject or user 10. The system 100 can selectively activate the flash illumination driver 120, the flash illumination unit 122, and the image sensor 132 in response to input received by way of the control or user interface 140.

In certain embodiments, the system 100 can further include a network interface unit 150, which enables wire-based and/or wireless system communication with a set of local and/or a remote networks 152 (e.g., a LAN, a WAN, the Internet, a satellite network, and/or a telephone network such as a mobile telephone network); and/or a data storage unit 160, which can include a local or remote device such as a disk drive on which a database storing a reference or enrolled facial image library 165 resides. One or more portions of such a library 165 can additionally or alternatively reside within the memory 200. Depending upon embodiment details, portions of the data storage unit 160 and/or the memory 200 can include fixed and/or removable storage media. A data storage unit 160 can include one or more types of storage media, such as electronic and/or optical data storage media, for instance, for storing facial image datasets.

Depending upon embodiment details, particular elements of the system 100 can be coupled by way of individual links or pathways, or a set of shared links, pathways, or buses 180. The inclusion or exclusion of certain system elements and/or manners in which system elements are coupled can depend upon embodiment details, for instance, whether the system 100 is based upon a special purpose architecture or platform or such as an embedded system, or a general purpose architecture or platform such as a general purpose computer or computing device, in a manner understood by one of ordinary skill in the art. The system 100 further includes a power source 190 such as a battery and/or circuitry coupled to a source of line power, where the power source 190 is configured to provide power to system elements in a manner readily understood by one of ordinary skill in the art.

The processing unit 110 can include a microcontroller, a microprocessor, an Application Specific Integrated Circuit (ASIC), a Programmable Logic Device (PLD) such as a Field Programmable Gate Array (FPGA), or another type of device configured to execute stored program instructions and/or perform state machine functions. The memory 200 includes one or more types of volatile and non-volatile memory configured to store configuration data, image data, and/or program instruction sets that facilitate image capture and user authentication or recognition operations in accordance with an embodiment of the disclosure. The memory 200 can include one or more of a register set, one or more buffers, Random Access Memory (RAM), and Read Only Memory (ROM) such as flash memory. In certain embodiments, the memory 200 can include (a) one or more types of removable memory (e.g., a memory stick) and (b) one or more types of interfaces (e.g., a Universal Serial Bus (USB) interface) that facilitate or enable signal or data transfer. In embodiments in which the system 10 includes an embedded processing unit 110, the memory 200 can include on-chip and/or off-chip memory.

In general, a system 10 in accordance with an embodiment of the present disclosure includes a power source 190; a flash illumination drive circuit 120; a flash illumination unit 122; a set of spectral filters 124; an image sensor 132; at least one of communication resources (e.g., wire-based and/or wireless communication, signal transfer, or data transfer links, lines, or pathways) and memory resources; and processing resources. As further described in detail hereafter, the flash illumination drive circuit 120, the flash illumination unit 122, and the set of spectral filters 124 are configured for providing at least one temporally brief, high intensity flash illumination pulse that exhibits near-infrared and possibly longer optical wavelengths, and which excludes or substantially excludes visible optical wavelengths. The image sensor 132 is configured for receiving at least one spectrally filtered flash illumination pulse from a subject's face, and generating a corresponding facial image dataset. Communication resources (e.g., coupled to the image sensor 132) facilitate or enable the transfer of an image dataset (e.g., a facial image dataset) generated by the image sensor 132 to at least one of memory resources and processing resources configured for performing at least one of image dataset storage operations and face detection, authentication, recognition, or discrimination operations upon image datasets in accordance with embodiments of the present disclosure. Processing resources can further be configured for performing associated system, apparatus, or device control operations.

The flash illumination unit 122 includes at least one apparatus, device, or structure configured to generate or output intense or very intense, short or very short pulses or bursts of illumination. The duration of any given pulse can be defined as a pulse duration, which can be less than approximately 500 microseconds, or approximately 20-250 microseconds, or 100-200 microseconds, or between about 1-250 microseconds (e.g., about 10-250 microseconds, or about 20, 25-50, 50-100, 150, or 250 microseconds). Such flash illumination pulses can be generated during a flash illumination generation or output interval, which can equal, approximately equal, correspond to, or be correlated with the pulse duration. In various embodiments, the flash illumination unit 122 includes a flashtube-based or flashtube-type device that is configured to generate a very high or high intensity, very short or short duration pulse or burst of flash illumination during a flash illumination discharge interval (e.g., which can equal, approximately equal, correspond to, or be correlated with a time interval specified above) by way of an electric glow discharge process. The flash illumination unit 122 in several embodiments includes a Xenon bulb.

The flash illumination drive circuit 120 includes circuitry configured to energize the flash illumination unit 122. The flash illumination drive circuit 120 can be, for instance, a commercially available integrated circuit that includes a Xenon photoflash charger and corresponding voltage control/monitoring circuitry. In a representative implementation, the flash illumination unit 122 can include a Xenon bulb such as a Perkin Elmer flash bulb type BGAC1015 (Perkin Elmer Inc., Waltham, Mass., USA) and the flash illumination drive circuit 120 can include a flash driver IC such as a Linear Technology LT3485 (Linear Technology Corporation, Milpitas, Calif., USA).

When driven at full power in the absence of the set of spectral filters 124, within a target spatial illumination region or area that is proximate to or generally near the flash illumination unit 122 (e.g., less than approximately 1 meter away from the flash illumination unit 122, or between approximately 30-65 cm away from the flash illumination unit 122, or between approximately 40-60 cm or 45-55 cm away from the flash illumination unit 122; and along or within approximately 10-20 (e.g, approximately 10-15) degrees of an axis of maximum illumination intensity corresponding to the flash illumination unit 122), during the discharge interval the flash illumination unit 122 can generate illumination having an intensity or brightness that exceeds or significantly exceeds (e.g., by approximately 1-2 orders of magnitude) an expected intensity or brightness of ambient light (e.g., sunlight) corresponding to a brightly lit outdoor scene (e.g., within an open area characterized by a substantial or complete lack of shade). In multiple embodiments, when driven at full power without spectral filtering, within the aforementioned target spatial illumination region or area, the flash illumination unit 122 can generate illumination having an intensity or brightness that can exceed (e.g., by several multiples, or approximately 1 order of magnitude) an expected intensity or brightness of ambient sunlight that provides the primary or sole source of ambient illumination within a brightly lit and/or highly reflective outdoor scene, for instance, corresponding to morning, mid-day, or afternoon sun in a cloudless scene that includes water (e.g., at a beach or swimming pool) or snow (e.g., in a mountain or polar environment). Within a target spatial illumination region or area proximately to the flash illumination unit 122, the intensity of the illumination provided by the unfiltered flash illumination unit 122 can thus overwhelm, significantly exceed, or readily or effectively compete with an expected intensity of ambient sunlight in essentially any environment on or proximate to the earth's surface.

Even though the discharge interval is brief or very brief, such intense illumination would be undesirable in various circumstances from the perspective of a subject or user 10. For instance, particular embodiments of the disclosure can be configured to periodically or regularly capture facial image data to monitor or validate a user's presence or identity at multiple points in time. A user 10 would find a one time or a periodic or regular presentation of such brief, intense, readily perceivable flashes of light to be highly distracting.

The set of spectral filters 124 is configured to receive flash illumination output by the illumination unit 122, and restrict or filter the wavelengths of flash illumination to which the user's eyes are exposed, thereby reducing or minimizing the extent to which the illumination generated by the flash illumination unit 122 affects the user's eyes and/or can be perceived by the user. The set of spectral filters 124 is configured to provide, output, pass, or transmit a set of spectrally filtered flash illumination pulse(s), where the spectrally filtered flash illumination pulse(s) travel along an optical path that intersects a target spatial illumination region or area within which the user's face 20 is expected to be positioned.

In a number of embodiments, the set of spectral filters 124 is disposed adjacent, substantially adjacent, generally adjacent, or proximate to the flash illumination unit 122. Hence, the aforementioned target spatial illumination region or area in which the user's face 20 is expected to be positioned can be less than approximately 1 meter away from an illumination exit surface or plane provided by the set of spectral filters 124 (e.g., between approximately 30-65 cm, or approximately 40-60 cm, or about 40-55 cm away from an exterior surface of the set of spectral filters 124 which is exposed to an environment in which the user 10 resides), and along or within approximately 10-20 (e.g., approximately 10-15) degrees of an axis of maximum illumination intensity corresponding to the flash illumination unit 122.

In several embodiments, the set of spectral filters 124 includes an optical pass or longpass filter that is intended or configured to block or exclude optical wavelengths shorter than a minimum pass wavelength $\lambda_p$, and transmit optical wavelengths equal to or longer than $\lambda_p$. In other embodiments, the set of spectral filters 124 can include one or more other types of optical filters, such as an optical bandpass filter configured to pass one or more particular optical wavelength bands.

In various embodiments, $\lambda_p$ approximately equals 700 nm, corresponding or approximately corresponding to a shortest optical wavelength in the near-infrared (NIR) portion of the optical spectrum. The set of spectral filters 124 is therefore configured to block or at least substantially exclude optical wavelengths shorter than near infrared wavelengths. Thus, the set of spectral filters 124 is configured to pass NIR and in several embodiments other infrared (IR) optical wavelengths. In some embodiments, the set of spectral filters 124 can include a single inexpensive or generally inexpensive plastic or glass absorption filter. In other embodiments, the set of spectral filters 124 can include another type of optical filter, such as an interference filter, a dichroic filter, or a cold mirror filter.

In some embodiments, the flash illumination unit 122 is associated with, includes, or is disposed adjacent to an optical integrator such as a housing, chamber, or cavity configured to receive illumination generated by a flashtube or flashtube-type device; optically integrate such illumination; and output multiphase flash illumination at an exit aperture. Such a flash illumination/optical integrator configuration is described in U.S. patent application Ser. No. 13/205,598, entitled "System and Method for Illuminating and Imaging the Iris of a Person," filed on 8 Aug. 2011, which is incorporated herein by reference in its entirety. In such embodiments, multiphase illumination exits the chamber's exit aperture, and propagates toward or through the set of spectral filters 124.

In several embodiments, the flash illumination unit 122 is driven at a reduced or significantly reduced power or energy level, for instance, at or below approximately 50% of a maximum power level (e.g., at or below approximately 25%, 20%, 15%, 10%, or 5% of a maximum power or energy level) in order to selectively or preferentially shift the optical spectrum of light generated thereby toward longer optical wavelengths, that is, toward the IR portion of the optical spectrum. As a result, a higher percentage of the spectral intensity output by the flash illumination unit 122 corresponds to NIR and/or IR wavelengths. Manners in which the spectral intensity output by a representative flash illumination unit 122 can be shifted toward the NIR and/or IR portions of the optical spectrum are shown in a publication entitled "High Performance Flash and Arc Lamps," available from Perkin Elmer Optoelectronics (Perkin Elmer Inc., Waltham, Mass., USA), pages 10-11, which is incorporated herein by reference in its entirety. In some embodiments, the flash illumination unit 122 is driven at approximately 5%-30% (e.g., less than about 25%, less than about 15-20%, or about 7-10%) of a maximum power or energy level.

Driving the flash illumination unit 122 at a reduced power or energy level decreases the intensity or brightness of the flash illumination generated thereby. Even when the flash illumination unit 122 is driven at a substantially reduced power or energy level, for instance, about 5-15% (e.g., about 7-10%) of a maximum power or energy level, within a target spatial illumination region or area proximate to the flash illumination unit 122, the generated flash illumination's intensity or brightness (e.g., the intensity or brightness of a single flash illumination pulse) can be expected to exceed, somewhat exceed, or approximately equal the intensity or brightness of bright or very bright ambient light (e.g., corresponding to the intensity of morning, mid-day, or afternoon sunshine in one or more environments such as those described above). In certain embodiments in which a further enhanced intensity of flash illumination (e.g., as measured before or after transmission of flash illumination through the set of spectral filters 124) is desired, the flash illumination unit 122 can include multiple flashlamps (e.g., which can be simultaneously or essentially simultaneously activated).

In several embodiments, when the flash illumination unit 122 is driven at approximately 10-30% of a maximum power level, within a target spatial illumination region or area proximate to the flash illumination unit 122, the intensity or brightness of the flash illumination produced thereby at least approximately equals the intensity or brightness of ambient sunlight, or exceeds the intensity or brightness of ambient sunlight by a multiple of at least approximately 1.25-3 (e.g., about 2-3), regardless or essentially regardless of an environment under consideration on or proximate to the surface of the earth. Correspondingly, within the target spatial illumination region or area proximate to the flash illumination unit 122, the intensity or brightness of the spectrally filtered flash illumination pulse(s) at least approximately equals the intensity or brightness of ambient sunlight, or exceeds the intensity or brightness of ambient sunlight by a multiple of at least approximately 1.25-3 (e.g., about 2-3), regardless or essentially regardless of an environment under consideration on, proximate to, or above the surface of the earth.

Within the aforementioned target spatial illumination region or area, the spectral intensity of NIR and/or IR illumination passed by the set of spectral filters 124 (e.g., the spectral intensity of a single spectrally filtered flash illumination pulse) can thus be expected to overwhelm, dominate, or readily compete with the spectral intensity of ambient NIR and/or IR light. As a result, within captured facial image data, the contribution of flash illumination provided by the spectrally filtered flash illumination unit 122 to pixel intensity values can be expected to overwhelm, dominate, or be readily extractable or distinguishable from the contribution of ambient light to pixel intensity values with respect to essentially any type of ambient lighting condition.

In view of the foregoing, the provision of high or very high intensity, short or very short duration flash illumination in association with appropriate spectral filtering provided by several embodiments of the present disclosure, as well as the generation of a flash illumination spectral shift as a result of driving the flash illumination unit 122 at a reduced power level in some embodiments, facilitates or enables surprisingly or unexpectedly robust facial authentication and/or recognition performance regardless or essentially regardless of ambient lighting conditions, in stark contrast to the prior art.

Driving the flash illumination unit 122 at a reduced power or energy level can additionally prolong, greatly prolong, or dramatically prolong the flash illumination unit's lifetime. In several embodiments, driving the flash illumination unit 122 at a reduced power or energy level can be expected to prolong an estimated flash illumination unit lifetime by several orders of magnitude compared to an estimated full power flash illumination unit lifetime. In some embodiments, driving the flash illumination unit 122 at a reduced power or energy level enables the flash illumination unit 122 to provide a lifetime of at least one to several million flash illumination pulses, or many millions of flash illumination pulses.

As indicated in FIG. 1A, illumination generated by the flash illumination unit 122 passes through and is filtered by the set of spectral filters 124, after which the filtered flash illumination strikes and is reflected from portions of the subject's face 20. A portion of such reflected flash illumination, along with ambient illumination reflected off of the subject's face and/or background ambient illumination, propagates to and through the lens 130, and is subsequently captured by the image sensor 132.

The image sensor 132 includes a set of optical signal detection elements or pixels (i.e., physical picture elements) configured to sense and integrate optical signals and generate at least one pixel intensity value corresponding to each pixel. Each pixel intensity value indicates an intensity of illumination that has been captured and integrated by a given pixel, in a manner readily understood by one of ordinary skill in the art. The image sensor can include, for instance, a CCD image sensor or a CMOS image sensor. In several embodiments, the lens 130 can be a standard refractive optical element that is provided by the manufacturer of an image sensor 132 under consideration (e.g., the lens 130 and the image sensor 132 can be carried by a single as-manufactured package or structure). Additionally or alternatively, in certain embodiments the lens 130 can include a custom designed diffractive or focusing element, which can include one or more spectral filters. In a representative implementation, the image sensor 132 includes or is a colour CMOS image sensor such as an Aptina model no. MT9V032 (Aptina Imaging Corporation, San Jose, Calif., USA).

The image sensor 132 can include a trigger, shutter control, or capture control input and a capture interval input in a manner understood by one of ordinary skill in the art. A capture control or strobe output of the image sensor 132 is coupled to a trigger control input of the flash illumination drive circuit 120, and the capture interval input is coupled to the processing unit 110. In association with or in response to an initiate capture signal received from the processing unit 110, the image sensor 132 triggers the activation of the flash illumination drive circuit 120, which drives the flash illumination unit 122 at a given power level (e.g., between approximately 5%-35% of a maximum power level) to produce a pulse of flash illumination. The image sensor 132 correspondingly captures and integrates optical signals during a flash illumination image capture interval in accordance with a capture duration signal received at its capture interval input.

In some embodiments, the system 100 can activate the image sensor 132 to estimate, determine, or measure an ambient or background illumination level or intensity prior to activating the flash illumination driver 120. More particularly, prior to generating flash illumination, the system 100 activate the image sensor 132 to capture one or more ambient illumination images, and determine or estimate whether a current or recent ambient illumination level or intensity corresponds to a given type of illumination situation (e.g., a bright sunlight/outdoor situation, or an indoor lighting situation). Based upon ambient illumination conditions, the system 100 can establish a flash illumination power level and/or adjust a flash illumination image capture interval in a manner that reduces, moderates, or balances a captured image intensity difference between outdoor and indoor lighting situations. For instance, the system 100 can (a) increase a flash illumination power level and/or the duration of a flash illumination image capture interval if ambient illumination corresponds to an indoor lighting situation; and/or (b) decrease a flash illumination power level and/or the duration of a flash illumination image capture interval if ambient illumination corresponds to a bright or very bright outdoor lighting situation.

In various embodiments, the flash illumination image capture interval is approximately equal to or less than the pulse duration or the flash illumination discharge interval (e.g., approximately 20-200 microseconds). The flash illumination that is reflected from the subject's face 20 and captured by the image sensor 132 during the flash illumination capture interval has a spectral intensity that is expected to overwhelm, dominate, or strongly compete with the spectral intensity of reflected and/or background ambient light that is also captured by the image sensor 132 during the flash illumination capture interval. As a result, pixel intensity values within the captured facial image data overwhelmingly or primarily correspond to the intensity of flash illumination reflected from the user's face 20 rather than the intensity of facially reflected and/or background ambient light.

The image sensor 132 includes a data output that is coupled to the captured image memory 210 in a manner understood by one of ordinary skill in the art. Following the capture of optical signals and the generation of corresponding image data during the flash illumination capture interval, such image data is transferred to the captured image memory as an image dataset, and more particularly, captured facial image data is transferred to the captured image memory 210 as a facial image dataset. Such facial image data can be subsequently processed by way of one or more flash-based face enrollment, detection, authentication, verification, or discrimination processes in accordance with the present disclosure, as further described in detail below with reference to FIGS. 3A and 3B.

In general, the flash illumination unit 122 and/or the set of spectral filters 124 can be spatially arranged, disposed, positioned, or oriented relative to a set of reference locations or axes of the image sensor 132 and/or an optical axis of the lens 130 in a wide variety of manners depending upon embodiment details. For instance, the flash illumination unit 122, the set of spectral filters 124, and the image sensor 132 can be positioned very close together (e.g., approximately directly adjacent to each other, or within approximately 2 cm of each other), moderately close to each other (e.g., approximately 5-10 cm from each other), or more significantly separated or relatively distant from each other (e.g., between approximately 10-25 cm from each other, or more than approximately 25 cm from each other). Moreover, depending upon embodiment details, the flash illumination unit 122 and/or the set of spectral filters 124 can be horizontally and/or vertically offset with respect to the lens 130 and/or the image sensor 132. In particular embodiments, the flash illumination unit 122 and the set of spectral filters 124 are spatially arranged, disposed, positioned, or oriented relative to the lens 130 and/or the image sensor 132 in a manner that reduces a likelihood of capturing unwanted or undesirable optical signals corresponding to specularly reflected illumination.

Figure 1B:
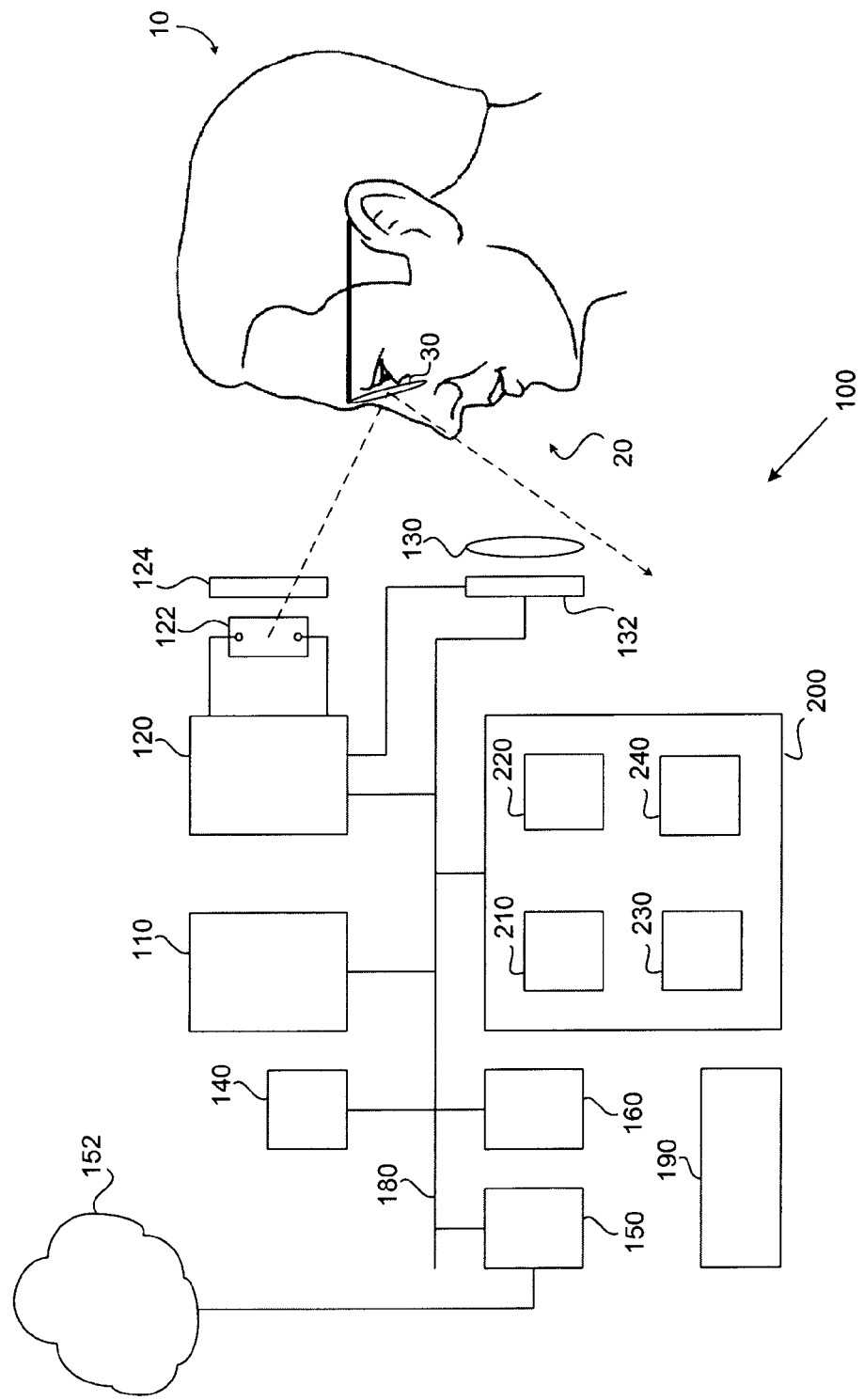
FIG. 1B is a block diagram of the system of FIG. 1A, illustrating a manner in which a relative spatial arrangement of a flash illumination unit and an image sensor can reduce or minimize a likelihood of capturing undesirable specular reflection(s) associated with user eyewear.

FIG. 1B is a block diagram of the system of FIG. 1A, illustrating a manner in which a relative spatial arrangement of a flash illumination unit 122 and an image sensor 132 can reduce or minimize a likelihood of image sensor capture of specular reflection(s) associated with user eyewear. In an embodiment, the flash illumination unit 122 (e.g., a flash illumination unit axis of maximum flash illumination intensity) is vertically offset above the image sensor 132 (e.g., relative to a central reference point at which a set of normal image sensor axes intersect) by a predetermined vertical offset or separation distance, for instance, less than approximately 25 cm, or between approximately 10-20 cm (e.g., about 15-17 cm, or about 16-18 cm), which is expected to enhance or maximize a likelihood that flash illumination incident upon the lenses of user eyewear 30 is reflected along an optical travel path that directs at least some or a substantial amount of such illumination away from an image capture area corresponding to the image sensor 132.

Because the lenses of user eyewear 30 are typically oriented at an angle (e.g., approximately 10-20 degrees) relative to a normal axis to the user's eyes and/or an eyewear frame that carries such lenses, at least some of the flash illumination incident upon the lenses of user eyewear 30 will be reflected by the eyewear lenses at an angle that differs from an angle at which flash illumination is reflected by the user's eyes and/or portions of the user's face. The aforementioned vertical offset distance can reduce or minimize a likelihood that the image sensor captures specular reflections from user eyewear 30 that exhibits typical eyewear lens configurations. As a result, captured facial image data more closely corresponds to illumination reflected from the subject's face 20 itself rather than the user's eyewear 30, thereby enabling higher accuracy face authentication, recognition, or discrimination.

In a representative implementation, an axis of maximum intensity of spectrally filtered flash illumination pulses transmitted through or exiting the set of spectral filters 124 is vertically offset from an optical axis of the lens 130 and a corresponding central axis or reference point of the image sensor 132 by less than approximately 25 cm, or between approximately 15-20 cm (e.g., approximately 16-18 cm). Such a vertical offset can be defined by a vertical distance measured along, adjacent, or substantially adjacent to a common surface corresponding to each of the set of spectral filters 124 and the image sensor 132, for instance, an exterior or externally accessible surface of a support structure, member, or housing that carries the set of spectral filters 124 and the image sensor 132.

In addition to the foregoing, the lens 130 and the image sensor 132 can be disposed or tilted at an angle relative to the set of spectral filters 124, such that an optical axis of the lens 130 and an image capture surface or plane provided by the image sensor 132 are cooperatively aligned relative to each other, but are offset from (i.e., non-parallel to) a surface or plane from which one or more spectrally filtered flash illumination pulses exit the set of spectral filters 124. For instance, the lens 130 and image sensor 132 can be tilted or tiltable (e.g., as a unit) such that an optical axis of the lens 130 and an image capture plane of the image sensor 132 are each disposed at an angle of approximately 5-15 degrees (e.g., about 8-13 degrees, or about 10-11 degrees) relative to an exterior or externally accessible planar surface of the set of spectral filters 124 from which a spectrally filtered flash illumination pulse can exit the set of spectral filters 124 and propagate toward or to a subject's face 20. Such an upward tilt disposes the optical axis of the lens 130 and the image capture plane of the image sensor 132 slightly upwards towards the subject's face 20 when the subject 10 is positioned within the target spatial illumination region, which can facilitate the consistent capture of facial images from subjects 10 spanning a wide range of body heights.

Figure 1C:
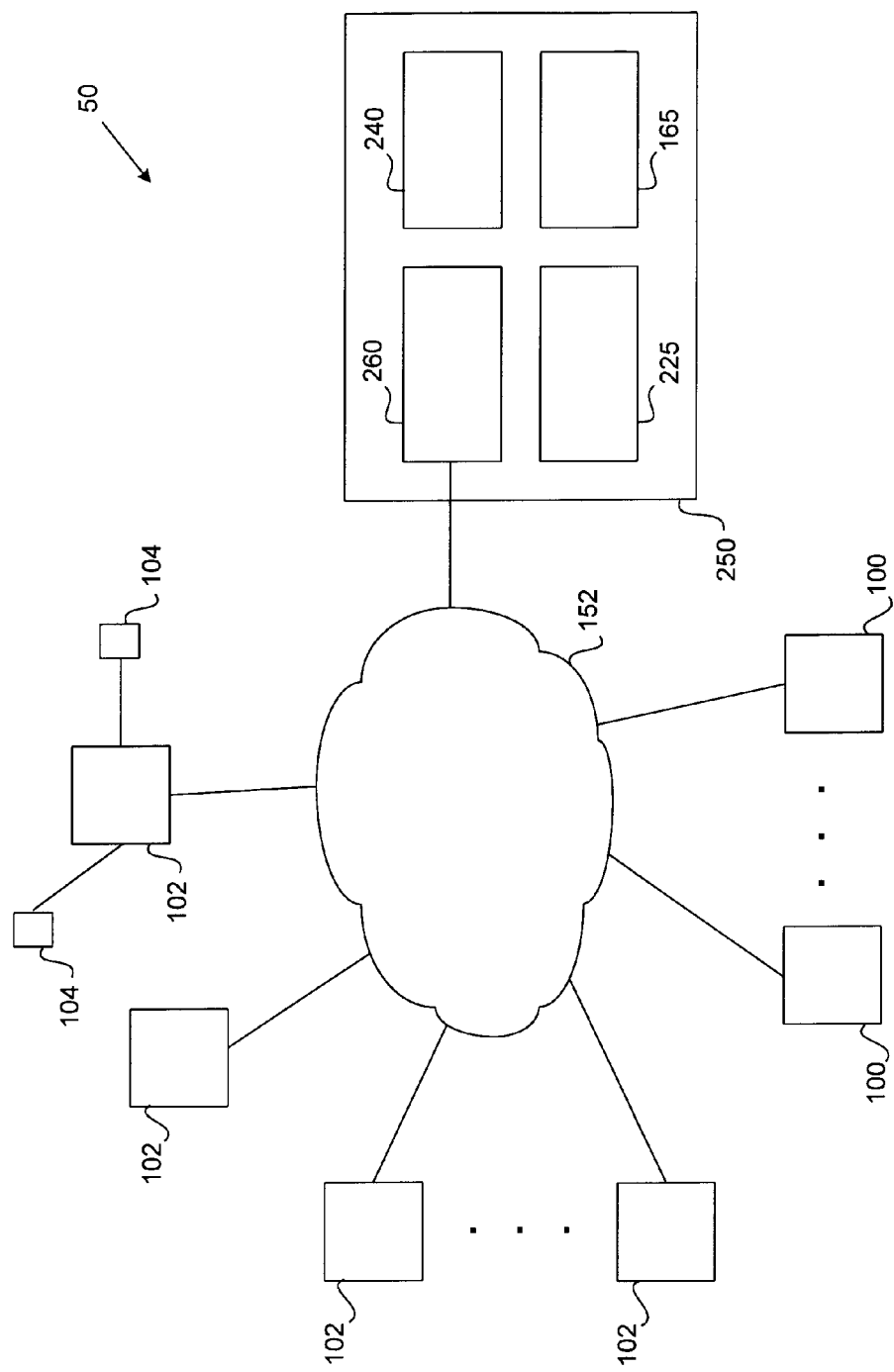
FIG. 1C is a block diagram of a flash-based face authentication and/or recognition system according to another embodiment of the disclosure.

FIG. 1C is a block diagram showing portions of a flash-based face authentication and/or recognition system 50 according to another embodiment of the disclosure. In an embodiment, such a system 50 includes a number of local systems, subsystems, apparatuses, or devices 100, 102, 104 configured for one or more of local capture of facial image data, generation of corresponding facial image datasets, and local storage or receipt of facial image datasets; and one or more remote systems, apparatuses, or devices 250 configured to receive or retrieve facial image datasets by way of such local systems or devices 100, 102, 104 and perform particular facial image dataset storage; query data set generation/storage; reference or enrollment data set generation/storage; and/or face authentication, verification, or discrimination operations.

The remote system(s) 250 can be configured for wire-based and/or wireless communication with particular local systems 100, 102, 104. The system 50 further includes a set of networks 152 (e.g., a LAN, a WAN, the Internet, a satellite network, and/or a telephone network such as a mobile telephone network) that facilitates or enables information transfer or communication between the local systems or devices 100, 102, 104 and the remote system(s) 250.

In some embodiments, a given local system, subsystem, apparatus, or device 100 can include or be a system 100 such as that described above with reference to FIGS. 1A and 1B. Additionally or alternatively, a local system, subsystem, apparatus, or device 102, 104 can include particular resources, devices, or elements configured for (a) generating flash illumination and locally capturing or storing image datasets (e.g., facial image datasets); (b) transferring or communicating locally captured facial image datasets to one or more other local systems 102, 104; (c) transferring or communicating locally captured or stored facial image datasets to one or more remote systems 250 for storage or processing in accordance with aspects of the present disclosure; and/or (c) receiving from such remote systems 250 results, notifications, alerts, or signals associated with or corresponding to facial image dataset storage and/or processing operations.

In some embodiments, a handheld, portable, or wearable facial image capture device 102 can include a flash illumination drive circuit 120, a flash illumination unit 122, a set of spectral filters 124, a lens 130, an image sensor 132, a processing unit 110, a memory 200, and a network interface unit 150. A remote system 250 configured to receive or retrieve, store, and process facial image datasets can include a set of processing/memory/data storage/network communication resources 260; a reference or enrolled image library 165; a query image library 225; and an authentication, verification, or discrimination module 240. In an embodiment, a remote system 250 can include a set of servers coupled to the Internet and/or another network.

Embodiments of the disclosure can be associated with, coupled to, and/or incorporated into, onto, or within a wide variety of systems, subsystems, apparatuses, or devices for which face detection, authentication, recognition, or discrimination operations may be useful. Representative non-limiting embodiments of certain types of systems, subsystems, apparatuses, or devices that include flash-based facial illumination generation, capture, and/or processing systems, subsystems, apparatuses, or devices in accordance with the present disclosure are described in detail hereafter.

Figure 2A:
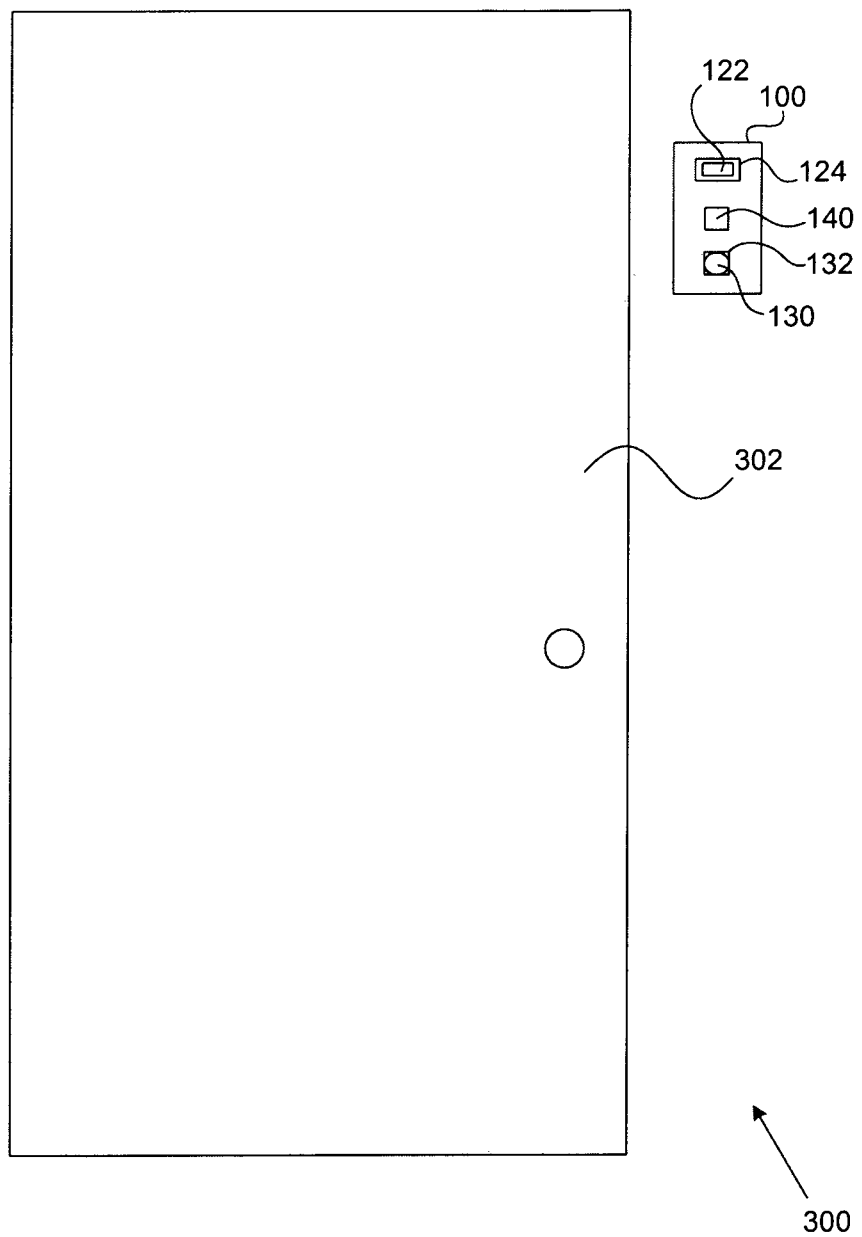
FIG. 2A is a schematic illustration of a representative entry control system that includes portions of a flash-based face authentication and/or recognition system according to an embodiment of the disclosure.

FIG. 2A is a schematic illustration of a representative entry or entryway control system 300 according to an embodiment of the disclosure. In an embodiment, an entry control system 300 includes a user access control structure such as a door, gate, or barrier 302 that is coupled to a flash-based face authentication and/or recognition system 100, which can be mounted in a wall adjacent to the door 302, or carried by the door 302 itself.

In response to user interaction with a user interface 140 that is coupled to the flash-based face authentication and/or recognition system 100 (e.g., in response to the user 10 pressing a button or presenting an RFID card, or in response to the user interface's automatic detection of the user's sustained presence across a time interval of approximately 2-3 seconds), the system 100 energizes a flash illumination unit 122, captures an image of the user's face 20 during a flash illumination image capture interval, generates corresponding facial image data, and performs face authentication and/or recognition operations using such facial image data. In the event that the user is authenticated or recognized, the user is allowed to open or use the door 302.

An entry control system 300 can include multiple flash illumination units 122, multiple image sensors 132, and possibly multiple user interfaces 140 corresponding to a single door 302. For instance, a first flash illumination unit-image sensor pair can be mounted at a first height with respect to a floor or walkway, and a second flash illumination unit-image sensor pair can be mounted at a second height with respect to the floor or walkway. Distinct user interfaces 140 can also be mounted at the first and second heights. Such embodiments can accommodate users of significantly different heights, or wheelchair-based users.

In some entry control system embodiments, such as certain embedded system embodiments, a single flash-based face authentication and/or recognition system 100 can correspond to a single door 302. Alternatively, portions of a flash-based face authentication and/or recognition system 100 such as a processing unit 110 and a memory 200 that includes one or more program instruction sets configured to perform face authentication and/or recognition operations can be coupled to multiple flash illumination units 122 and image sensors 132, where any given flash illumination unit-image sensor pair is associated with a distinct door 302 for which user access is controlled by way of flash-based face authentication and/or recognition in accordance with the present disclosure. Thus, a single flash-based face authentication and/or recognition system 100 can control user access to multiple doors 302 by including a number of flash illumination units 122, image sensors 132, and user interfaces 140 corresponding to the number of doors 302 under consideration.

Figure 2B:
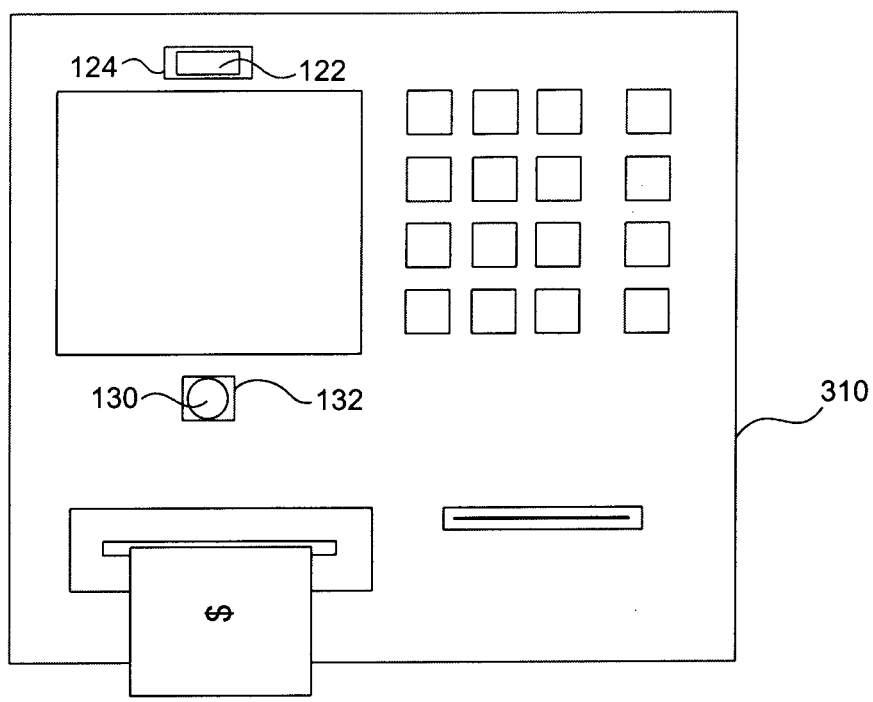
FIG. 2B is a schematic illustration of a representative Automatic Teller Machine (ATM) that carries and/or is coupled to portions of a flash-based face authentication and/or recognition system according to an embodiment of the disclosure.

FIG. 2B is a schematic illustration of a representative financial transaction authorization control system 310, which can be, for instance, an Automated Teller Machine (ATM) or other type of financial transaction system or apparatus configured to perform particular flash-based user authentication and/or recognition operations in accordance with an embodiment of the disclosure. In an embodiment, such an ATM 310 includes, incorporates, and/or is coupled to portions of a flash-based face authentication and/or recognition system 100. For instance, a portion of the ATM 310 that serves as an ATM user interface can include a flash illumination unit 122, a set of spectral filters 124, a lens 130, and an image sensor 132. Other elements (e.g., a flash illumination drive circuit 120) of the flash-based face authentication and/or recognition system 100 can be internal to the ATM 310 itself, and/or remote from the ATM 310 (e.g., coupled to the ATM 310 by way of a computer network).

In association with a user's presence in front of or interaction with the ATM 310, insertion of an ATM or similar type of financial transaction card into the ATM 310, and/or entry of a valid user identifier (e.g., a PIN code), the flash illumination unit 122 can generate flash illumination during a flash illumination discharge interval, and the image sensor 132 can generate facial image data during a flash illumination capture interval. Such facial image data can be locally and/or remotely processed in accordance with a face authentication and/or recognition process. In the event that the user's identity is validated, the user can access one or more user financial account(s), such as particular accounts associated with the ATM card. Otherwise, user access to such accounts is denied. In certain embodiments, when the user's identity cannot be validated, captured facial image data can be saved and forwarded to a financial institution's fraud detection department.

Figure 2C:
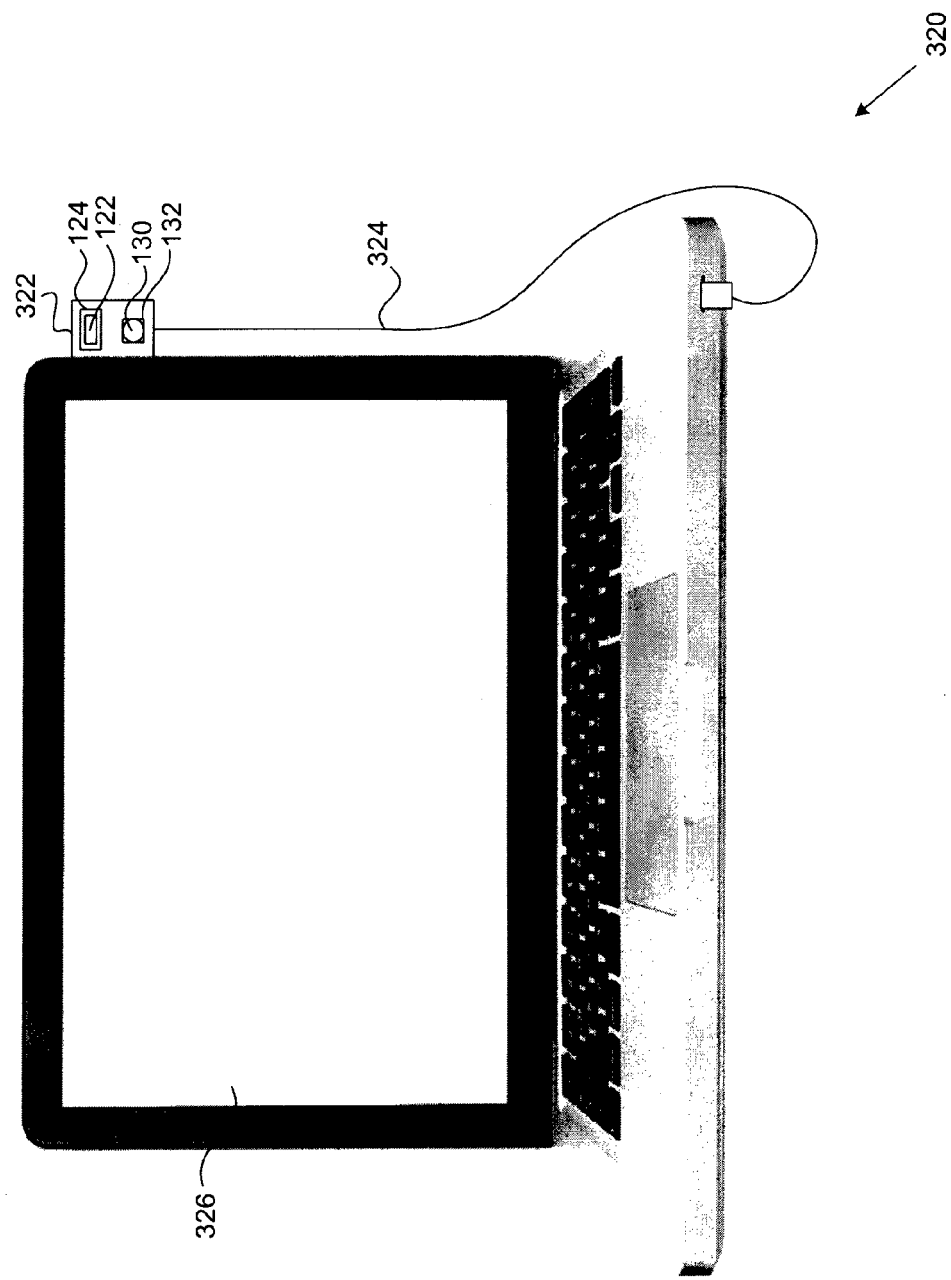
FIG. 2C is a schematic illustration of a representative laptop computer that is coupled to a flash-based face authentication and/or recognition system according to an embodiment of the disclosure.

FIG. 2C is a schematic illustration of a representative laptop computer 320 that is coupled to a flash-based face authentication and/or recognition system 100 according to an embodiment of the disclosure. In an embodiment, portions of the flash-based face authentication and/or recognition system 100 are carried by a housing 322 that can be attached to a portion of the laptop computer 302. For instance, the housing 322 can be mounted or clipped (e.g., in a repositionable or removable manner) to an external border of the laptop computer's display 326.

The housing 322 can carry a flash illumination unit 122, a set of spectral filters 124, a lens 130, and an image sensor 132, which can be coupled to the laptop computer 320 by way of a standard interface or link such as a USB cable. In some embodiments, the housing 322 can additionally carry a flash illumination drive circuit 120 and possibly additional flash illumination control circuitry. Other portions of the flash-based face authentication and/or recognition system 100, for instance, the processing unit 110 and the memory 200, can be implemented by way of laptop computer resources, and/or resources remote from the laptop computer 320 (e.g., which can communicate with a network interface unit 150 of the laptop computer 320 by way of a network).

Such a flash-based face authentication and/or recognition system 100 can be configured to generate spectrally filtered flash illumination and capture facial image data corresponding to a computer user 10, and perform face authentication, recognition, or discrimination operations for controlling initial user access to or operation of the laptop computer 320 based upon validation of the user's face 20. Certain embodiments can be configured to grant access to particular laptop computer 320, computer network, and/or remote computer or database resources on a selective basis depending upon the identity of the computer user 10 as determined by flash-based face authentication, recognition, or discrimination operations in accordance with the present disclosure.

The system 100 can additionally be configured to intermittently, periodically, or repeatedly generate spectrally filtered flash illumination and capture facial image data, and manage or control continued or ongoing user access to or operation of the laptop computer 320 based upon consistent user identity validation or verification. Particular embodiments of the system 100 can further be configured intermittently, periodically, or repeatedly generate flash illumination; capture image data in association with the generation of flash illumination; determine or detect the presence or absence of a computer user 10 based upon such captured image data; and selectively transition the laptop computer 320 to a secured and/or power saving mode (e.g., sleep) mode in the event that the computer user 10 is absent for a given time period (e.g., 10 or more minutes).

Figure 2D:
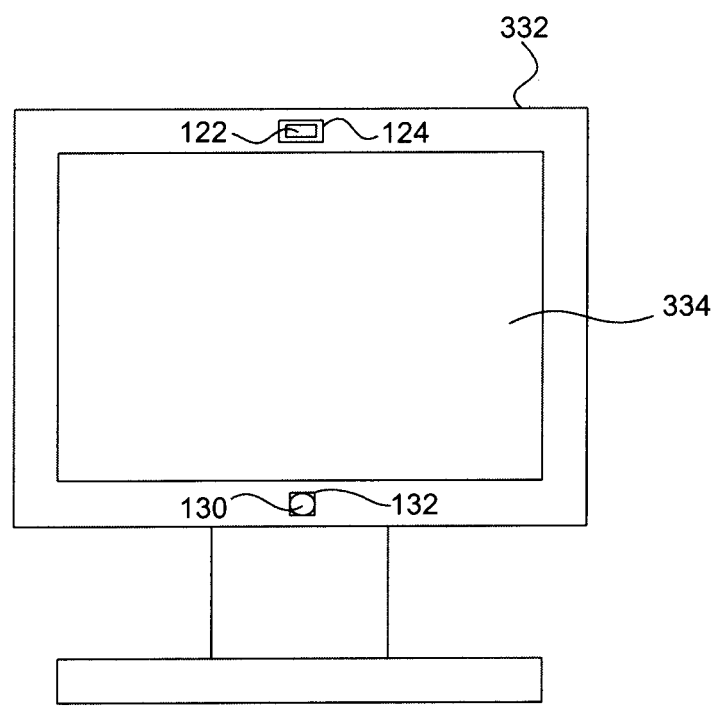
FIG. 2D is a schematic illustration of a representative computer display device that carries portions of a flash-based face authentication and/or recognition system according to an embodiment of the disclosure.

FIG. 2D is a schematic illustration of a representative computer display device 330 that carries portions of a flash-based face authentication and/or recognition system 100 according to an embodiment of the disclosure. In an embodiment, a flash illumination unit 122, a set of spectral filters 124, a lens 130, and an image sensor 132 are carried by (e.g., built onto or into) portions of a display device housing 322 that carries a display surface or screen 334 such as an LCD or LED display. A flash illumination drive circuit 120 can also be built into such a display device 330. When the display device 330 is coupled to a computer system, one or more flash-based face detection, authentication, verification, or discrimination operations can occur in a manner identical, essentially identical, or analogous to that described above with respect to FIG. 2C. In view of FIG. 2D, one of ordinary skill in the art will understand that a flash illumination drive circuit 120, a flash illumination unit 122, a set of spectral filters 124, a lens 130, and an image sensor 132 can be built into portions of a laptop computer 320, or carried by or built into portions of a tablet computer or other type of handheld or portable device such as a personal communication device.

Figure 2E:
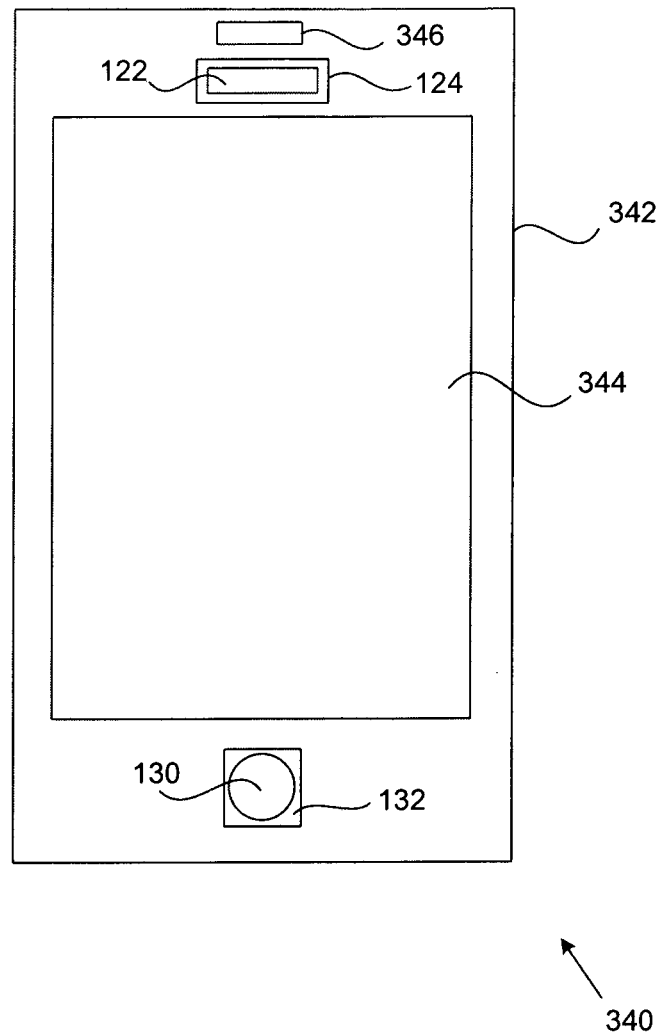
FIG. 2E is a schematic illustration of a representative mobile phone that carries a flash-based face authentication and/or recognition system according to an embodiment of the disclosure.

FIG. 2E is a schematic illustration of a representative portable or handheld device such as a mobile phone 340 that carries a flash-based face authentication and/or recognition system 100 according to an embodiment of the disclosure. In an embodiment, the mobile phone 340 includes a housing 342, a user interface 344 such as a display device that provides a graphical user interface (GUI) responsive to user input, and a speaker 346. The housing 342 can carry a flash illumination unit 122, a set of spectral filters 124, a lens 130, and an image sensor 132 on a given housing surface. A flash illumination drive circuit 120 can be carried internal to the housing 342. Other elements of a flash-based face authentication and/or recognition system 100, such as the processing unit 110 and the memory 200, can be implemented using built-in mobile phone resources. Additionally, certain elements of a flash-based face authentication and/or recognition system 100 (e.g., an enrolled facial image library 165 and/or a face authentication module 240) can reside on a remote computer system, database, or device that is configured for communication with the mobile phone 340.

In response to mobile phone activation (e.g., corresponding to a key press or entry of a user security code), the flash illumination unit 122 can output flash illumination. Spectrally filtered flash illumination can be reflected off of a mobile phone user's face and captured by the image sensor 132, which can generate corresponding facial image data. The flash-based face authentication and/or recognition system 100 can perform face authentication or recognition operations and authorize (i.e., allow or prevent) user access to or operation of the mobile phone 340 based upon the outcome of such operations.

While FIGS. 2A-2E illustrate aspects of representative systems that are configurable to perform flash-based user authentication and/or verification in accordance embodiments of the disclosure, the present disclosure encompasses a wide variety of systems, apparatuses, devices, equipment, products, or objects that can be configured to perform flash-based user authentication and/or verification operations in a manner identical or analogous to that described herein. For example, a flash illumination drive circuit 120, a flash illumination unit 122, a set of spectral filters, the lens 130, an image sensor 132, a processing unit 110, and/or the memory 200 can be coupled to or carried by an automotive or mechanized vehicle (e.g., a car, truck, motorcycle, or bus), or a piece of mechanized or engineering equipment (e.g., a construction crane), as portions of a vehicle or equipment operation authorization and/or anti-theft system that controls one or more aspects of vehicle or equipment operation based upon user validation). As another example, a flash illumination unit 122, a set of spectral filters 124, the lens 130, an image sensor 132, a processing unit 110, and/or the memory 200 can form portions of a firearm usage authorization and/or safety lock system that is coupled to or carried by a firearm. As a further example, a flash illumination drive circuit 120, a flash illumination unit 122, a set of spectral filters 124, a lens 130, an image sensor 132, a processing unit 110, and a memory 200 can be included in a point-of-sale system configured for local capture of facial image data, and remote processing of such data (e.g., by a remote computer system) for credit or debit transaction authorization purposes. As yet another example, a flash illumination drive circuit 120, a flash illumination unit 122, a set of spectral filters 124, a lens 130, an image sensor 132, a processing unit 110, and a memory 200 can be included in a handheld or portable facial image capture device 102 which can be carried or worn by security or law enforcement personnel, and which is configured to store (e.g., in a local fixed or removable memory) captured facial image datasets. Captured or stored facial image datasets can be communicated or transferred to another system (e.g., a remote computer system) at one or more times for facial image storage, verification, and/or discrimination.

Aspects of Representative Flash-Based Face Authentication or Recognition Processes In various embodiments, a face detection, authentication, recognition, and/or discrimination module 240 includes one or more program instruction sets directed to managing or performing flash-based face detection, authentication, recognition, and/or discrimination operations in accordance with the present disclosure. In association with managing or performing such operations, a face detection, authentication, recognition, and/or discrimination module 240 can access one or more of a captured image memory 210, a query image memory 220; an authentication or recognition processing memory 230; and/or a reference or enrolled image database 165, one or more portions of which can reside within a memory 200 and/or upon a local or remote data storage unit 160. In some embodiments, a captured image memory 210 can store one or more facial image datasets corresponding to captured facial images; the query image memory 220 can store one or more query datasets corresponding to query images; and the authentication or recognition processing memory 230 can store data generated (e.g., determined eye position values, statistical data corresponding to query datasets, extracted template parameters, and/or modified, adjusted, or amended query datasets) or retrieved (e.g., one or more reference or enrollment datasets, corresponding to reference or enrolled images relative to which query datasets can be processed) during flash-based face authentication and/or recognition operations.

Figure 3A:
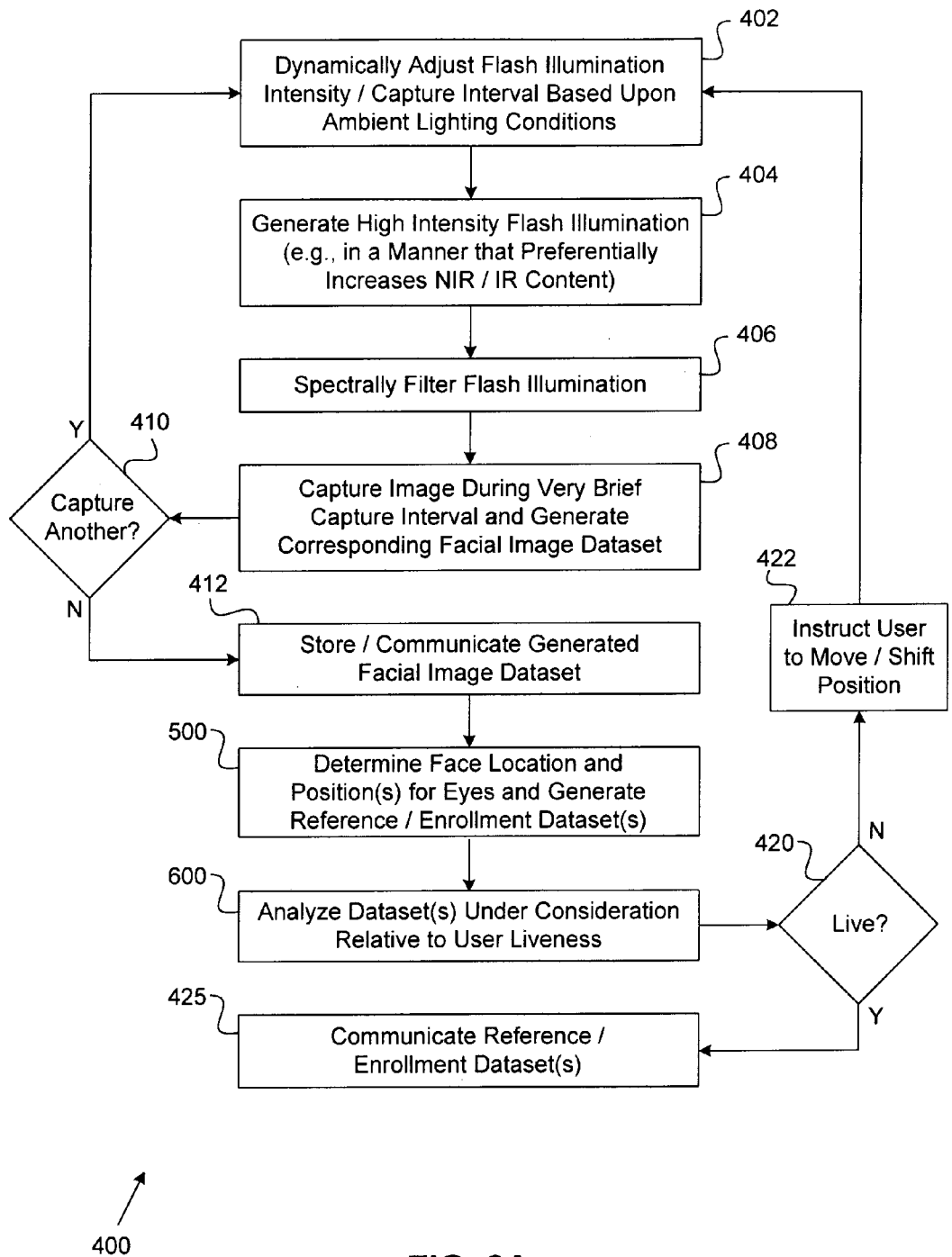
FIG. 3A is a flow diagram of a flash-based facial image enrollment process according to an embodiment of the disclosure.

FIG. 3A is a flow diagram of a flash-based facial image enrollment process 400 according to an embodiment of the disclosure. The flash-based facial image enrollment process 400 can involve capturing one or more facial images of a subject that is positioned in a target spatial illumination region that is within approximately 1 meter (e.g., approximately 30-65 cm, or about 45-50 cm) from the flash illumination unit 122. In an embodiment, the process 400 includes a first process portion 402 that involves estimating or determining an ambient illumination level or intensity, and determining or establishing a flash illumination power level and/or a flash illumination image capture interval based upon ambient or background illumination conditions. The process 400 further includes a second process portion 404 that involves generating high intensity flash illumination using a flash bulb, flashlamp, or flashtube during the flash illumination discharge interval (e.g., less than approximately 250 microseconds, or approximately 20-200 microseconds). The second process portion 404 includes generating flash illumination in a manner that preferentially increases the flash illumination's NIR and/or IR spectral content and/or spectral intensity. For instance, the second process portion 404 can include driving the flash illumination unit 122 at an appropriately reduced power level (e.g., approximately 25% or less than a maximum power level) in order to enhance or maximize the NIR and/or IR spectral content and/or spectral intensity of the flash illumination.

The process 400 further includes a third process portion 406 that involves spectrally filtering the flash illumination, for instance, by using a set of spectral filters 124 that passes optical wavelengths that equal or exceed a pass or longpass wavelength $\lambda_p$ (e.g., where $\lambda_p$ approximately equals 700 nm). A fourth process portion 408 involves capturing an image during the flash illumination image capture interval, which can be approximately equal to or less than the flash illumination discharge interval, and generating a corresponding facial image dataset. In some embodiments, the process 400 includes a fifth process portion 408 that involves determining whether another image of the user 20 is to be captured. If so, the process 400 can return to the first process portion 402.

Within the facial image dataset, contributions to pixel intensity values arise from flash illumination reflected from the user's face 20, as well as ambient light reflected from the user's face 20 and background ambient light. As a result of the flash illumination's spectral intensity and the applied spectral filtering, the flash illumination reflected from the user's face 20 is expected to overwhelm, dominate, exceed, or strongly compete with facially reflected as well as background ambient light, regardless or essentially regardless of ambient lighting conditions.

A captured image corresponds to a spatial image capture area within which (a) the user's face 20 is positioned or is expected to be positioned; and (b) portions of a background scene exist outside of the boundary or border of the user's face 20. Relative to the captured image, pixels that map to the spatial location of the user's face are expected to have intensity values that overwhelm, dominate, exceed, or strongly compete with the intensity values of pixels that map to spatial locations of the background scene, regardless or essentially regardless of ambient lighting conditions. Additionally, with respect to pixels that map to the spatial location of the user's face 20, the intensity values of such pixels are expected to overwhelmingly or primarily arise from the flash illumination reflected from the user's face 20 rather than ambient light, regardless or essentially regardless of ambient lighting conditions.

Certain embodiments of the process 400 can include a sixth process portion 412 that involves communicating one or more captured facial image datasets to another system or device (e.g., a remote system or device). The process 400 additionally includes a seventh process portion 500 that involves determining for each facial image dataset under consideration a face location and a set of candidate positions for the user's eyes, and the generation of one or more reference or enrollment datasets. Particular aspects of the seventh process portion 500 are described in detail below with reference to FIG. 4A.

The process 400 can optionally include an eighth process portion 600 that involves analyzing one or more reference or enrollment datasets to determine a likelihood that the subject 10 captured by the image sensor 132 is a live person, rather than, for instance, a printed picture of a person or a digital image of a person on a display screen (e.g., an LCD display of a handheld or portable device such as a mobile phone or laptop computer). A printed picture or digital image may be presented to the image sensor 132 in an attempt to deceive the system 100.

The flash illumination provided by embodiments of the present disclosure can enhance a likelihood of accurately determining whether the subject 10 is a live person. More particularly, flash illumination generated by a flash bulb, flashlamp, flashtube, or electric glow discharge device includes spectral components that would be partially absorbed by a live person's skin, but which would be strongly reflected by surfaces or materials such as paper, cardboard, and LCD or other types of display screens.

As further described below with reference to FIG. 5, the eighth process portion 600 can involve generating a liveness decision and setting the value of a liveness flag or liveness status indicator, and generating a corresponding liveness confidence measure. A ninth process portion 420 can determine the likelihood that the subject 10 is a live person based upon the liveness decision and the liveness confidence measure (e.g., if the liveness decision by itself indicates that the subject 10 is not likely to be a live person; or the liveness decision indicates that the subject 10 may be a live person but the liveness confidence measure is below a predetermined threshold value). If the subject 10 appears unlikely to be a live person, a tenth process portion 422 can involve instructing or prompting the user 20 to shift or adjust their position relative to the image sensor 132, after which the process 400 can return to the first process portion 402. If the subject 10 appears likely to be a live person, in certain embodiments the process 400 can include an eleventh process portion 425 that involves communicating one or more reference or enrollment datasets to another system or device.

Figure 3B:
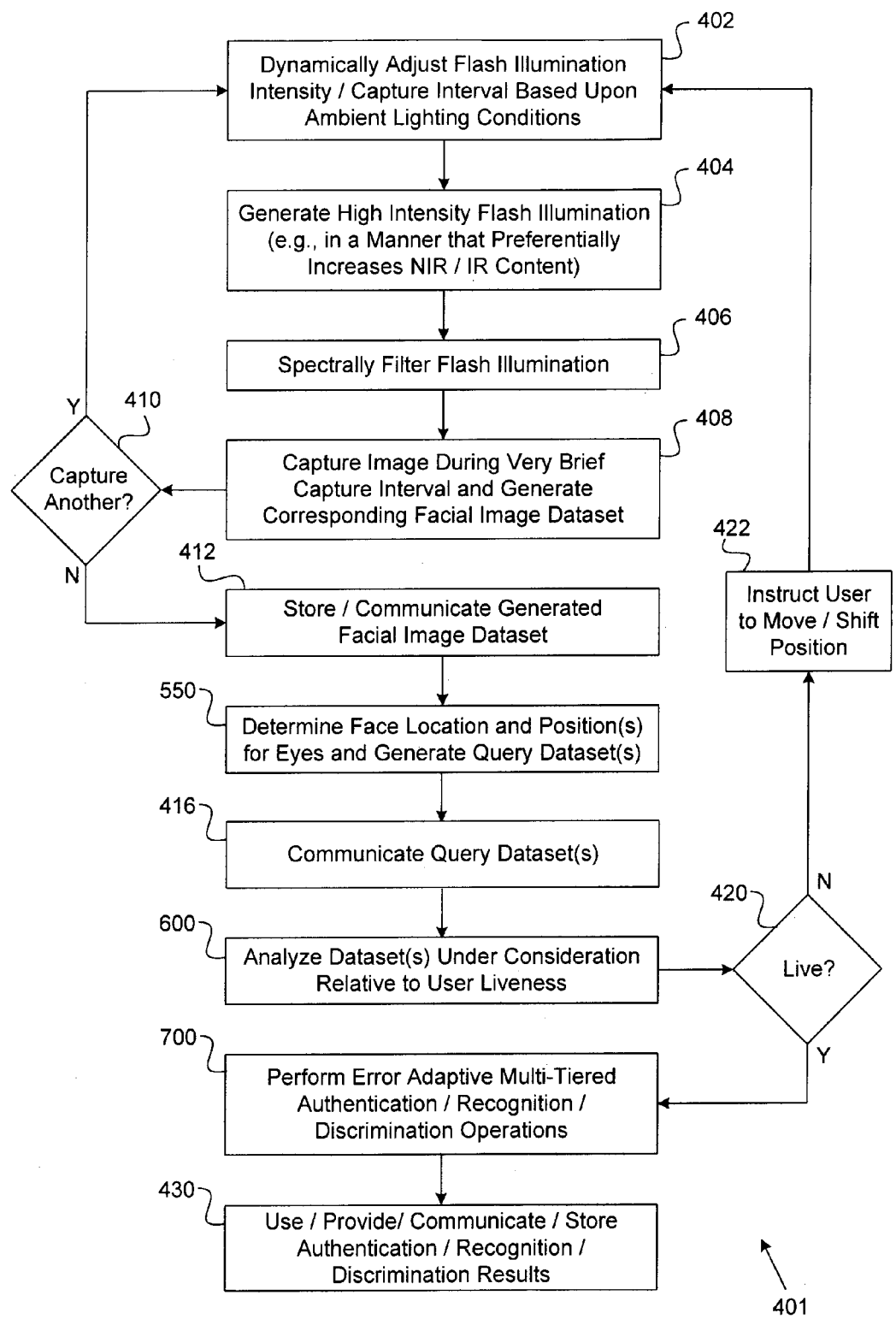
FIG. 3B is a flow diagram of a flash-based face authentication, recognition, or discrimination process according to an embodiment of the disclosure.

FIG. 3B is a flow diagram of a flash-based face authentication, recognition, or discrimination process 401 according to an embodiment of the disclosure. The flash-based face authentication, recognition, or discrimination process 401 can involve capturing one or more facial images of a subject that is positioned in a target spatial illumination region that is within approximately 1 meter (e.g., approximately 30-65 cm, or about 45-50 cm) from the flash illumination unit 122. In an embodiment, the process 401 includes first through sixth process portions 402-412 that are identical, essentially identical, or substantially identical to those described above with reference to FIG. 3A. The process 401 also includes a seventh process portion 550 that involves determining for each facial image dataset under consideration a face location and a set of candidate positions for the user's eyes, and the generation of a corresponding query dataset. Particular aspects of the seventh process portion 550 are described in detail below with reference to FIG. 4B. Certain embodiments of the process 401 include an eighth process portion 416 that involves communicating one or more query datasets to another system or device (e.g., a remote system)

The process 401 can optionally include a ninth process portion 600 that involves analyzing one or more query datasets to determine a likelihood that the subject 10 captured by the image sensor 132 is a live person. The ninth process portion 600 can involve generating a liveness decision and setting the value of a liveness flag or liveness status indicator, and generating a corresponding liveness confidence measure. A tenth process portion 420 can determine the likelihood that the subject 10 is a live person based upon the liveness decision and the liveness confidence measure. If the subject 10 appears unlikely to be a live person, an eleventh process portion 422 can involve instructing or prompting the user 20 to shift or adjust their position relative to the image sensor 132, after which the process 401 can return to the first process portion 402.

The process 401 further includes a twelfth process portion 700 that involves performing a face authentication, recognition, or discrimination process, such as error adaptive multi-tiered face authentication or recognition operations, as further described in detail below with reference to FIG. 6. The process 401 additionally includes a thirteenth process portion 730 that involves automatically using, providing, communicating, outputting, presenting, and/or storing authentication or recognition results. The thirteenth process portion 730 can include generating or communicating messages, notifications, or alerts, and/or granting or preventing user access to one or more types of systems, apparatuses, or devices (e.g., such as described above in relation to FIGS. 2A-2E) based upon authentication, recognition, or discrimination results.

Figure 4A:
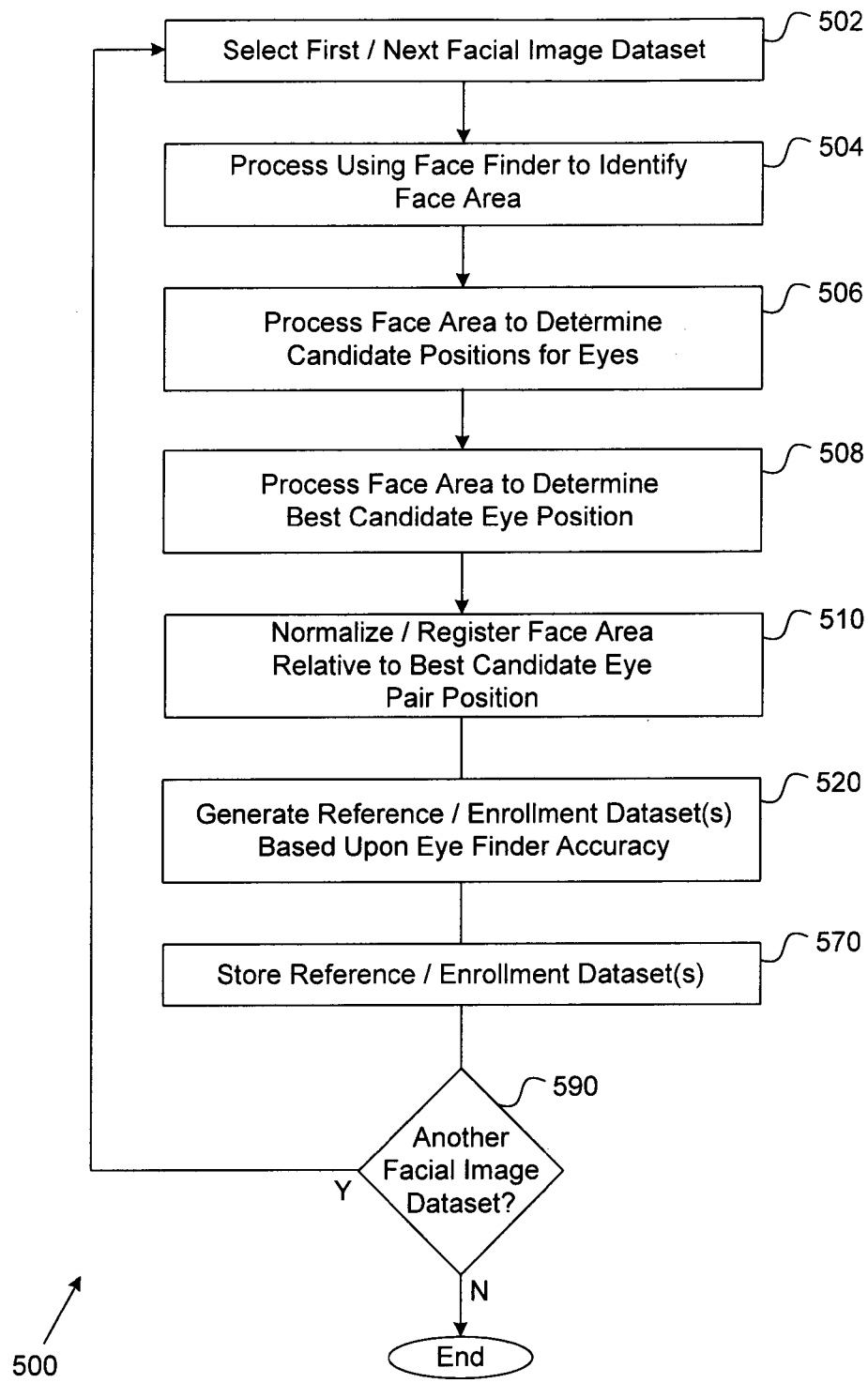
FIG. 4A is a flow diagram of a reference or enrollment dataset generation process according to an embodiment of the disclosure.

FIG. 4A is a flow diagram of a reference or enrollment dataset generation process 500 according to an embodiment of the disclosure. In an embodiment, the process 500 includes a first process portion 502 that involves selecting a first or next facial image dataset. A second process portion 504 involves processing the facial image dataset under consideration using a face finder to identify a face area (e.g., a face rectangle). In a representative implementation, the second process portion 504 includes using a Haar cascade face finder, and identifying a face rectangle.

A third process portion 506 involves processing facial image data corresponding to the identified face area using an eye finder to determine a set of candidate positions for the user's eyes; and a fourth process portion 508 involves processing facial image data corresponding to the identified face area with respect to the candidate positions for the user's eyes to determine a best or most likely eye pair position. Depending upon embodiment details, the third and fourth process portions 506, 508 can be performed as a single process or as separate processes. Moreover, the third and fourth process portions 506, 508 can involve the use of a single eye finder, detector, or filter, or a combination of distinct or different eye finders, detectors, or filters. In a representative implementation, the third process portion 506 includes the use of a Haar cascade eye filter, and the fourth process portion includes the use of a Gabor eye finder.

A fifth process portion 510 involves normalizing or registering the identified face area relative to the best or most likely eye pair position, and a sixth process portion 520 involves generating a set of reference or enrollment datasets based upon the measured, determined, or estimated accuracy and/or types or magnitudes of errors associated with the eye finder(s). The set of reference or enrollment datasets includes a reference or enrollment dataset corresponding to the best or most likely eye position.

A seventh process portion 570 involves storing the reference or enrollment dataset(s), and an optional eighth process portion 590 can involve determining whether another facial image dataset requires consideration. If so, the process 500 can return to the first process portion 502.

Figure 4B:
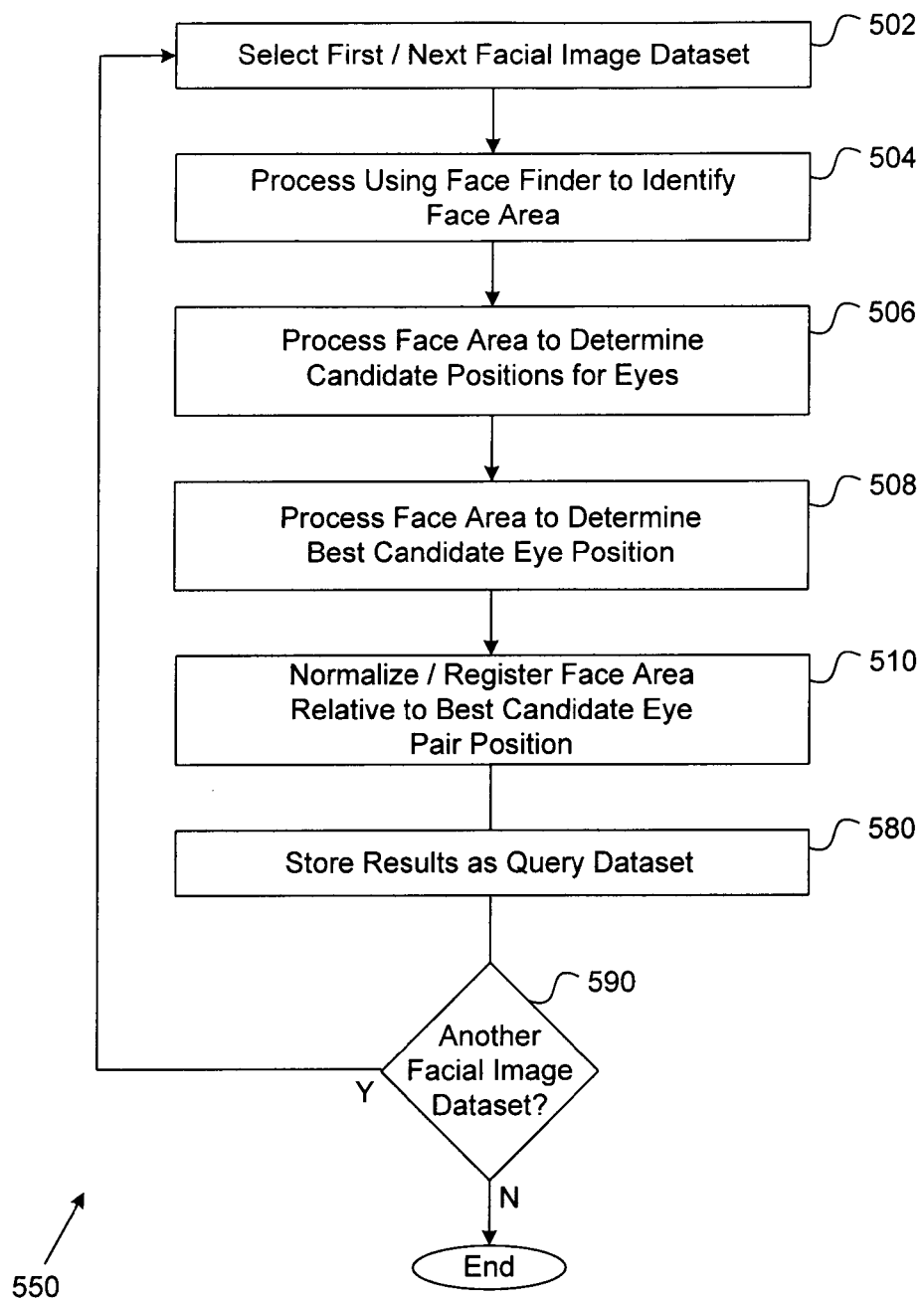
FIG. 4B is a flow diagram of a query dataset generation process according to an embodiment of the disclosure.

FIG. 4B is a flow diagram of a query dataset generation process 550 according to an embodiment of the disclosure. In an embodiment, the process 550 includes a first through a fifth process portion 502-510 that are identical, essentially identical, or substantially identical to corresponding first through fifth process portions 502-510 described above with reference to FIG. 4A. A sixth process portion 580 involves storing a normalized or registered face area such as a face rectangle corresponding to a best candidate eye pair position as a query dataset. The sixth process portion 580 can also include storing the set of candidate positions for the user's eyes. A seventh process portion 590 can involve determining whether another facial image dataset requires consideration; if so, the process 500 can return to the first process portion 502.

Figure 5:
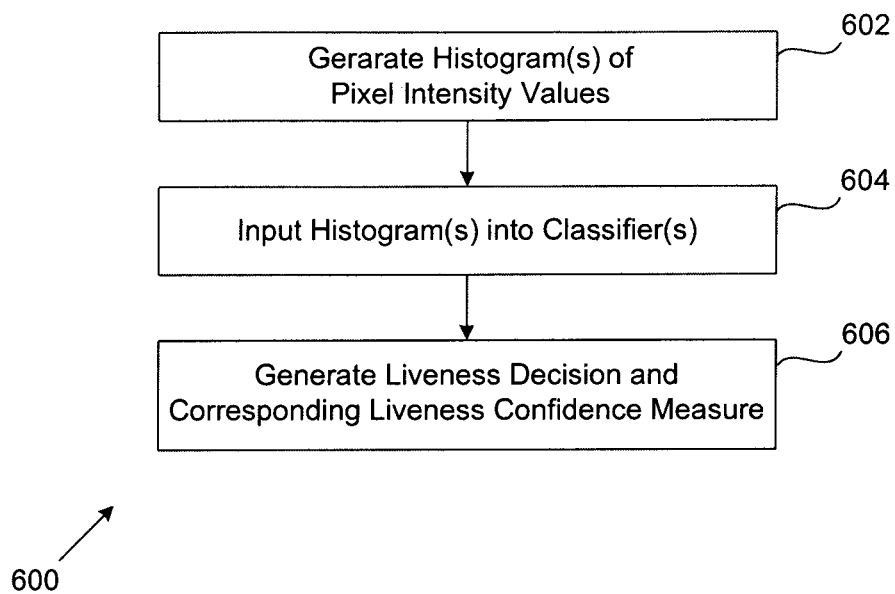
FIG. 5 is a flow diagram of a user liveness determination process according to an embodiment of the disclosure.

FIG. 5 is a flow diagram of a user liveness determination process 600 according to an embodiment of the disclosure. In an embodiment, the process 600 includes a first process portion 602 that involves generating one or more histograms of pixel intensity values for a query dataset under consideration, and a second process portion 604 that involves inputting the historgram(s) into one or more automated classifiers. In some embodiments, the historgram(s) can be based upon greyscale values. The classifier(s) can include a Bayesian classifier, a neural network such as a multilayer perceptron network, a support vector machine, or essentially any type of two-class pattern classifier or tool. A given classifier can be trained using reference datasets corresponding to facial images of live subjects 10 and non-live subjects 10. A third process portion 606 involves generating a liveness decision (e.g., a yes/no decision) and/or setting a liveness flag or status indicator that indicates whether the query dataset under consideration likely corresponds to a live person, and a liveness confidence measure corresponding to the liveness decision.

Figure 6:
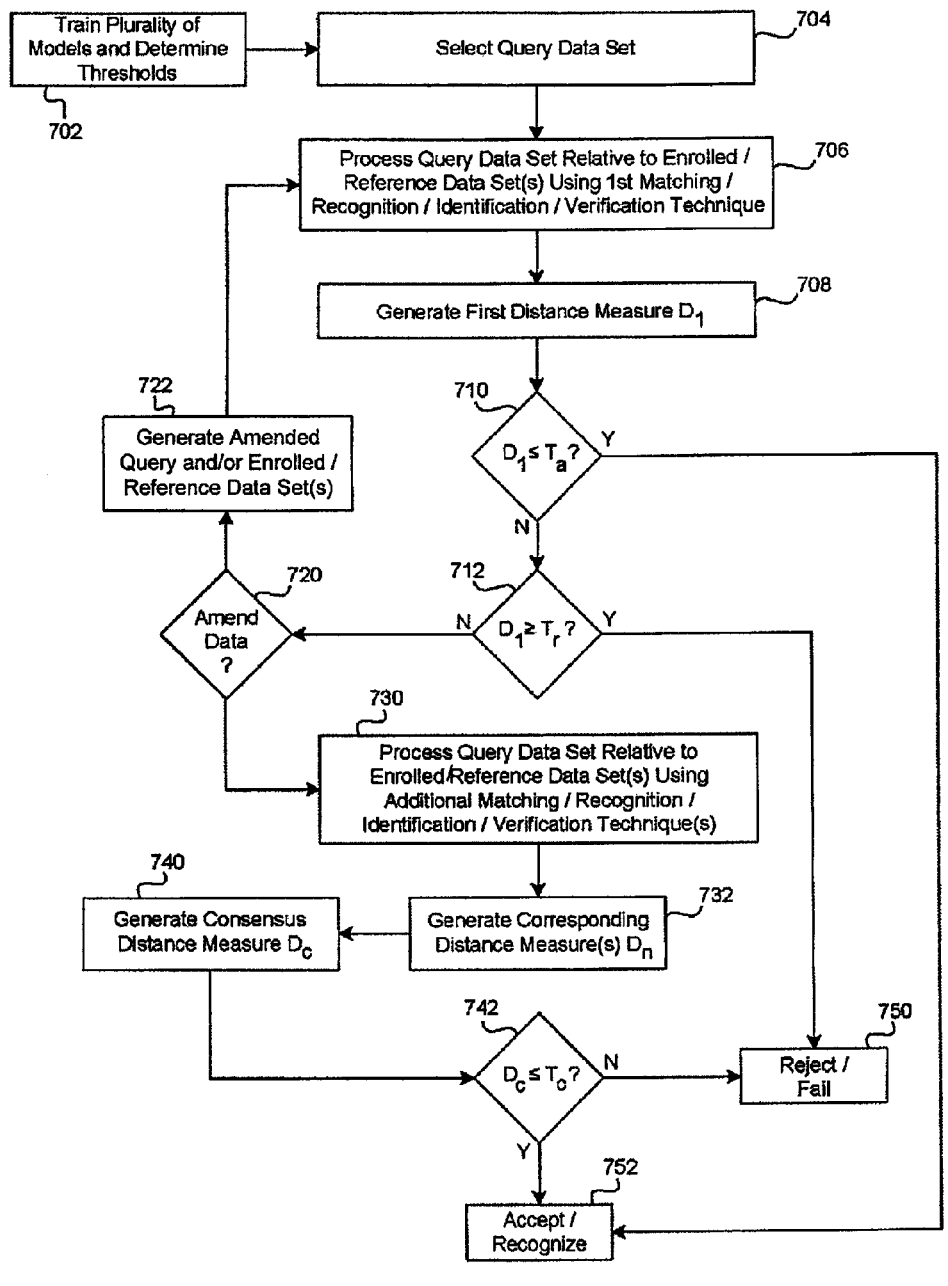
FIG. 6 is a flow diagram of an error adaptive multi-tiered authentication and/or recognition process according to an embodiment of the disclosure.

FIG. 6 is a flow diagram of an error adaptive multi-tiered authentication and/or recognition process 700 according to an embodiment of the disclosure. Depending upon embodiment details, portions of the process 700 can be performed upon a single query dataset, or multiple query datasets (e.g., on a sequential basis, or in parallel, for particular query datasets or each query dataset) generated or considered in association with flash-based face authentication or recognition operations in accordance with the present disclosure.

In an embodiment, the process 700 includes a first process portion 702 that involves training a plurality of face authentication or recognition models and generating a set of threshold values corresponding to such models. Any given model corresponds to a particular or distinct face matching, recognition, identification, or verification technique (hereafter technique). The first process portion 702 is performed in an off-line mode prior to on-line or real-time face authentication or recognition operations.

During the first process portion 702, for a given model under consideration, genuine, accurate, or substantially accurate training query datasets that directly, closely, or generally closely correspond to reference or enrollment datasets are input into the model. The model is trained to accept such query datasets as valid, accurate, or authentic. Additionally, impostor or outlier training query datasets are input into the model, and the model is trained to reject such query datasets as invalid, inaccurate, or inauthentic.

During or in association with the first process portion 702, at least one threshold value T can be determined for each model under consideration based upon statistical analysis. Each threshold value T facilitates or enables a classification or categorization of a query dataset generated or input during an on-line or real-time mode relative to the aforementioned training query datasets, such that the authenticity, validity, or identity of the on-line or real-time query dataset can be established, and the on-line or real-time query dataset can correspondingly be accepted or rejected. Depending upon embodiment details, a single threshold value T or multiple distinct threshold values such as a confirmed acceptance threshold $T_a$ and a confirmed rejection threshold $T_r$ can be determined for a given model. Additionally, at least one consensus or composite threshold value $T_c$ can be correlated with or determined for a plurality of models, where the consensus threshold value $T_c$ can correspond to a mathematical function (e.g., a weighted average) applied to individual threshold values T.

A second process 704 portion involves selecting a query dataset for consideration, and a third process portion 706 involves inputting the selected query dataset into a first model. The third process portion 706 involves processing the query dataset relative to reference or enrollment datasets in accordance with a first technique. In several embodiments, the first technique exhibits computational efficiency, as well as highly accurate, accurate, or generally accurate face authentication or recognition performance across variable lighting conditions. In some embodiments, the first technique is selected and/or optimized with regard to an embedded application under consideration. In a representative implementation, the first technique is a chi-squared distance based technique that operates upon histograms corresponding to the query dataset and one or more reference or enrollment datasets. Such an implementation can be expected to be fast and accurate in view of a wide range of lighting conditions. Additionally, such an implantation is well suited to embedded systems or devices having limited or minimal computational resources.

A fourth process portion 708 involves generating a first distance measure $D_1$ based upon the first technique, and a fifth process portion 710 involves determining whether the first distance measure $D_1$ is less than or equal to an acceptance threshold $T_a$. The acceptance threshold $T_a$ can be determined in association with the first process portion 702. If the first distance measure $D_1$ is less than or equal to the acceptance threshold $T_a$, the process 700 continues to a fourteenth process portion 752 that involves accepting, validating, or recognizing the query dataset. If the first distance measure $D_1$ is not less than or equal to the acceptance threshold $T_a$, a fifth process portion 710 involves determining whether the first distance measure $D_1$ is greater than or equal to a rejection threshold $T_r$, where the rejection threshold $T_r$ can be determined in association with the first process portion 702. If the first distance measure $D_1$ is greater than or equal to the rejection threshold $T_r$, the process 700 continues to a thirteenth process portion 750 that involves rejecting the query dataset.

In the event that the first distance measure $D_1$ falls between the acceptance threshold $T_a$ and the rejection threshold $T_r$, an optional seventh process portion 720 determines whether to amend the query dataset and/or a reference or enrollment dataset, for instance, to account for error(s) in determining the best candidate eye pair position. If a dataset is to be amended, an eighth process portion 722 can generate an amended query dataset and/or an amended reference or enrollment dataset by producing a corresponding misalignment dataset and/or introducing small positional changes or offsets (which can be predetermined or random) to the position of one or both eyes within the dataset(s) under consideration, after which the process 700 can return to the third process portion 706.

In the event that an image dataset is not to be amended, or a predetermined number of image datasets have already been generated, a ninth process portion 730 involves inputting the original query dataset and/or one or more amended query datasets into one or more additional models. The ninth process portion 730 involves processing the original query dataset and/or one or more amended query datasets relative to one or more reference or enrollment datasets, which can include amended reference or enrollment datasets, using one or more additional face matching, recognition, identification, or verification techniques (hereafter additional technique(s)). Such additional techniques can include principal component analysis (PCA), linear discriminant analysis (LDA), or other techniques. In general, the first technique and each additional technique can be complementary to each other with regard to computational efficiency and acceptance/rejection accuracy. In some embodiments, one or more of the additional techniques can be less computationally efficient than the first technique, although a high or generally high level of computational efficiency may be desirable across all such techniques associated with the process 700.

A tenth process portion 732 involves generating one or more additional distance measures $D_n$ corresponding to the additional techniques, and an eleventh process portion 740 involves generating a consensus distance measure $D_c$ with respect to each additional distance measure $D_n$, and possibly also with respect to the first distance measure $D_1$. The consensus distance measure $D_c$ can be based upon a mathematical relationship (e.g., a weighted average) involving each additional distance measure $D_n$, and can possibly further involve the first distance measure $D_1$. The nature of such a mathematical relationship and the distance measures considered thereby can depend upon embodiment details.

A twelfth process portion 742 involves determining whether the consensus distance measure $D_c$ is less than or equal to the consensus threshold $T_c$, where the consensus threshold $T_c$ can be determined in association with the first process portion 702. If the consensus distance measure $D_c$ is less than or equal to the consensus threshold $T_c$, the process 700 proceeds to the fourteenth process portion 752 to accept, validate, or recognize the query dataset. Otherwise, the process 700 proceeds to the thirteenth process portion 750 to reject the query dataset.

In the foregoing manner, various embodiments of the disclosure are described for addressing at least one of the foregoing disadvantages. Such embodiments are intended to be encompassed by the following claims, which are not to be limited to specific forms or arrangements of parts so described and it will be apparent to one skilled in the art in view of this disclosure that numerous changes and/or modification can be made, which are also intended to be encompassed by the following claims.

The invention claimed is:

1. A system for face authentication or recognition comprising:
    a flash illumination unit having a flashtube, the flash illumination unit configured to output a flash illumination pulse having a spectral content and a pulse duration;
    a set of spectral filters configured to receive a flash illumination pulse generated by the flash illumination unit and configured to pass a spectrally filtered flash illumination pulse that includes optical wavelengths within at least one of a near-infrared (NIR) and an infrared (IR) portion of the optical spectrum, and which at least substantially excludes optical wavelengths shorter than NIR wavelengths;
    an image sensor configured to receive reflected illumination from a subject having a face, the reflected illumination corresponding to the spectrally filtered flash illumination pulse, the image sensor further configured to capture an image during an image capture interval and generate a corresponding facial image dataset;
    a memory configured to store the facial image dataset; and
    a processing unit configured to perform one of face authentication operations and face recognition operations upon the stored facial image dataset to respectively one of authenticate and recognize an identity of the subject,
    wherein the pulse duration is less than 500 microseconds, and
    wherein the image capture interval is equal to or less than the pulse duration.

2. The system of claim 1, further comprising a flash illumination control circuit configured to drive the flash illumination unit in a manner that preferentially shifts the spectral content of the flash illumination pulse toward the IR portion of the optical spectrum.

3. The system of claim 1, wherein within a spatial region that is proximate to the flash illumination unit the spectrally filtered flash illumination pulse has an intensity that is at least approximately equal to an intensity of ambient sunlight within an outdoor scene that is brightly lit as a result of the ambient sunlight.

4. The system of claim 1, wherein the flash illumination unit, the set of spectral filters, and the image sensor form portions of one of an entryway access control system, a computer access control system, a user identity consistency verification system, a financial transaction authorization system, a portable communication device usage authorization system, an automotive vehicle operation authorization system, a mechanized equipment operation authorization system, a firearm usage authorization system, a portable facial image capture system, and a wearable facial image capture system.

5. The system of claim 1, wherein an image capture plane of the image sensor is tilted relative to a planar surface from which the spectrally filtered flash illumination pulse exits the set of spectral illumination filters by approximately 5-15 degrees.

6. A method for face authentication or recognition comprising:
    generating a flash illumination pulse by way of an electric glow discharge process, the flash illumination pulse having a spectral content and a pulse duration;
    generating a spectrally filtered flash illumination pulse that includes optical wavelengths within at least one of a NIR and an IR portion of the optical spectrum, and which at least substantially excludes optical wavelengths shorter than NIR wavelengths;
    capturing reflected illumination from a subject having a face, the reflected illumination corresponding to the spectrally filtered flash illumination pulse;
    generating a facial image dataset corresponding to the reflected illumination;
    storing the facial image dataset in a memory; and
    performing one of face authentication and face recognition operations using the set of facial image data to respectively one of authenticate and recognize an identity of the subject,
    wherein the pulse duration is less than 500 microseconds, and
    wherein the image capture interval is equal to or less than the pulse duration.

7. The method of claim 6, further comprising driving the flash illumination unit in a manner that preferentially shifts the spectral content of the flash illumination pulse toward the IR portion of the optical spectrum.

8. The method of claim 6, wherein within a spatial region that is proximate to the flash illumination unit the spectrally filtered flash illumination pulse has an intensity that is at least approximately equal to an intensity of ambient sunlight within an outdoor scene that is brightly lit as a result of the ambient sunlight.

9. The method of claim 6, further comprising controlling one of subject access to an entryway, subject operation of a computer, subject financial transaction authorization, subject operation of a portable communication device, subject operation of an automotive vehicle, subject operation of a piece of mechanized equipment, and subject operation of a firearm based upon one of the face authentication and face recognition operations.

10. The method of claim 6, wherein processing the facial image dataset comprises:
    processing the facial image dataset to identify a face rectangle;
    processing the face rectangle to identify a set of candidate positions corresponding to a pair of eyes on the subject's face;
    processing the face rectangle to determine a best candidate position for the pair of eyes; and
    generating a plurality of enrolment datasets corresponding to the facial image dataset based upon an accuracy of an eye finder.

11. The method of claim 6, wherein processing the facial image dataset comprises:
    processing the facial image dataset to identify a face rectangle;
    processing the face rectangle to identify a set of candidate positions corresponding to a pair of eyes on the subject's face;
    processing the face rectangle to determine a best candidate position for the pair of eyes;
    generating a query dataset corresponding to the face rectangle and the best candidate position for the pair of eyes; and
    processing the query dataset using a plurality of matching techniques relative to at least one enrollment dataset.

12. The method of claim 11, wherein processing the facial image dataset to identify a face rectangle comprises processing the facial image dataset using a Haar cascade face finder, wherein processing the face rectangle to identify a set of candidate positions corresponding to a pair of eyes comprises processing the face rectangle using a Haar cascade filter, and wherein processing the face rectangle to identify the best candidate position for the pair of eyes comprises processing the face rectangle using a Gabor eye finder.

13. The method of claim 11, wherein processing the query dataset using a plurality of matching techniques comprises:
    processing the query dataset using a first matching technique relative to the at least one enrollment dataset;
    generating a first distance measure corresponding to the first matching technique;
    determining whether the first distance measure indicates an accept or reject condition; and
    generating one of an amended query dataset an amended enrolment dataset in the event that the first distance measure fails to indicate an accept or reject condition.

14. The method of claim 11, wherein processing the query dataset using a plurality of matching techniques comprises:
    processing the query dataset using a first matching technique relative to the at least one enrollment dataset;
    generating a first distance measure corresponding to the first matching technique;
    processing the query dataset using at least one of a second matching technique and a third matching technique relative to the at least one enrollment dataset;
    generating at least one of a second distance measure corresponding to the second matching technique and a third distance measure corresponding to the third matching technique;
    generating a consensus distance measure using at least two of the first distance measure, the second distance measure, and the third distance measure; and
    determining whether the consensus distance measure indicates one of an accept condition and a reject condition,
    wherein the first matching technique has a higher computational efficiency than at least one of the second matching technique and the third matching technique.

15. The method of claim 6, wherein performing one of face authentication and face recognition operations comprises determining a likelihood that the subject is a live person.

* * * * *